US012087109B2

United States Patent
Hinduja et al.

(10) Patent No.: US 12,087,109 B2
(45) Date of Patent: Sep. 10, 2024

(54) PREDICTION OF SERVICE COMPLETION TIME FOR VEHICLE SERVICE

(71) Applicant: ANI TECHNOLOGIES PRIVATE LIMITED, Bengaluru (IN)

(72) Inventors: Hitesh Hinduja, Thane (IN); Smruti Chourasia, Jabalpur (IN); Hrishikesh Bharadwaj Chakrapani, Bangalore (IN); Krishna Koushik Vsr, Nellore (IN); Gaurav Agarwal, Bangalore (IN); Punit Mahipal, Bangalore (IN)

(73) Assignee: ANI TECHNOLOGIES PRIVATE LIMITED, Bengaluru (IN)

( * ) Notice: Subject to any disclaimer, the term of this patent is extended or adjusted under 35 U.S.C. 154(b) by 349 days.

(21) Appl. No.: 17/645,705

(22) Filed: Dec. 22, 2021

(65) Prior Publication Data
US 2022/0207931 A1 Jun. 30, 2022

(30) Foreign Application Priority Data
Dec. 30, 2020 (IN) .............................. 202041057229

(51) Int. Cl.
*G07C 5/08* (2006.01)
*B60S 5/00* (2006.01)
(Continued)

(52) U.S. Cl.
CPC ................ *G07C 5/085* (2013.01); *B60S 5/00* (2013.01); *G06N 20/00* (2019.01); *G06Q 10/20* (2013.01); *G07C 5/008* (2013.01); *G07C 5/0808* (2013.01)

(58) Field of Classification Search
CPC ...... G07C 5/085; G07C 5/008; G07C 5/0808; B60S 5/00; G06N 20/00; G06N 20/20; G06Q 10/20
See application file for complete search history.

(56) References Cited

U.S. PATENT DOCUMENTS 10,922,726 B1 * 2/2021 Nelson ............... G06Q 30/0283
10,949,814 B1 * 3/2021 Nelson ................ G06Q 10/20
(Continued)

FOREIGN PATENT DOCUMENTS

AU 2016202398 A1 * 11/2016
CN 105894097 A 8/2016
(Continued)

*Primary Examiner* — Adam R Mott
*Assistant Examiner* — Heather J Keniry
(74) *Attorney, Agent, or Firm* — CHIP Law Group

(57) ABSTRACT

A method for facilitating vehicle servicing is provided. A first plurality of feature values corresponding to a first plurality of features are determined, for each of a plurality of vehicles. A second plurality of feature values corresponding to a second plurality of features are determined, for each of a plurality of service centers at which the plurality of vehicles were serviced. Based on the first and second pluralities of feature values, a machine learning model is trained to predict service completion times for servicing vehicles. For determining a service completion time for servicing a first vehicle at a first service center, a vehicular dataset of the first vehicle is provided as input to the machine learning model. The machine learning model predicts the service completion time based on the inputted vehicular dataset. The first vehicle is serviced at the first service center in compliance with the predicted service completion time.

18 Claims, 14 Drawing Sheets

(51) Int. Cl.
*G06N 20/00* (2019.01)
*G06N 20/20* (2019.01)
*G06Q 10/20* (2023.01)
*G07C 5/00* (2006.01)

(56) References Cited

U.S. PATENT DOCUMENTS

| | | | |
|---|---|---|---|
| 2019/0197798 A1* | 6/2019 | Abari | G06Q 10/02 |
| 2019/0204097 A1* | 7/2019 | Starns | G07C 5/008 |
| 2020/0023846 A1* | 1/2020 | Husain | H04W 4/44 |
| 2020/0074411 A1* | 3/2020 | Hughes | G06Q 10/06 |
| 2020/0126326 A1* | 4/2020 | Lavie | G06Q 10/20 |
| 2021/0182454 A1* | 6/2021 | Smaili | G06F 30/15 |
| 2022/0068053 A1* | 3/2022 | Hinduja | B60W 50/0205 |
| 2022/0165104 A1* | 5/2022 | Gardiner | G06Q 30/02 |

FOREIGN PATENT DOCUMENTS

| | | |
|---|---|---|
| CN | 111178386 A | 5/2020 |
| EP | 1879153 A2 | 1/2008 |
| KR | 20200031331 A | 3/2020 |
| WO | 2017063035 A1 | 4/2017 |

* cited by examiner

| Identification Information of Vehicle | Vehicle model | Asset health index | Probability of failure of vehicular system (%) | Running cost per unit distance (dollar cost per km) | Service schedule (km) |
|---|---|---|---|---|---|
| V_ID1 | ABC | 93 | 23 | 0.11 | 8,000 |
| V_ID2 | ABC | 87 | 47 | 0.87 | 8,000 |
| V_ID3 | PQR | 75 | 68 | 0.3 | 10,000 |
| V_ID4 | PQR | 66 | 88 | 1.2 | 10,000 |
| V_ID5 | PQR | 68 | 75 | 1.8 | 10,000 |

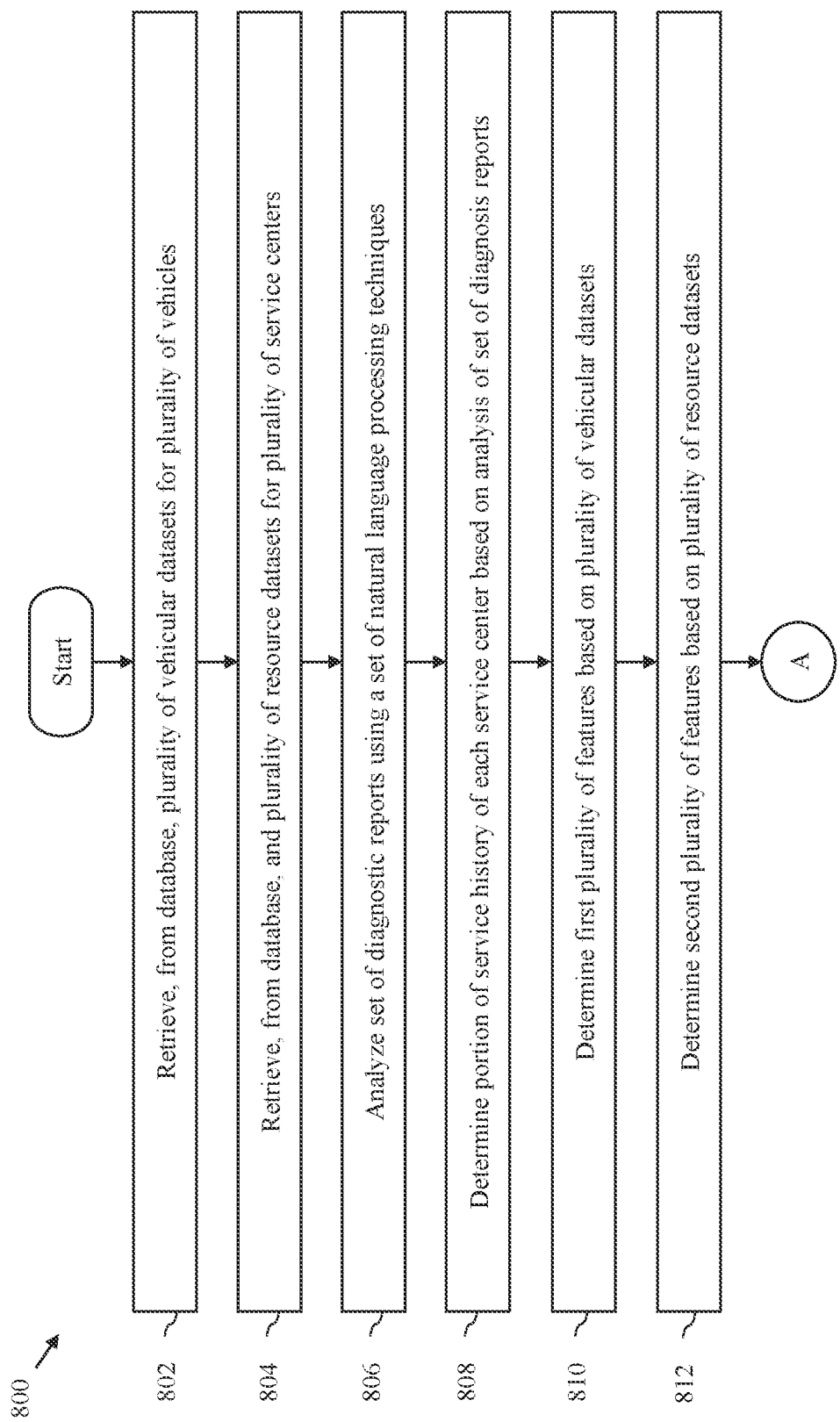

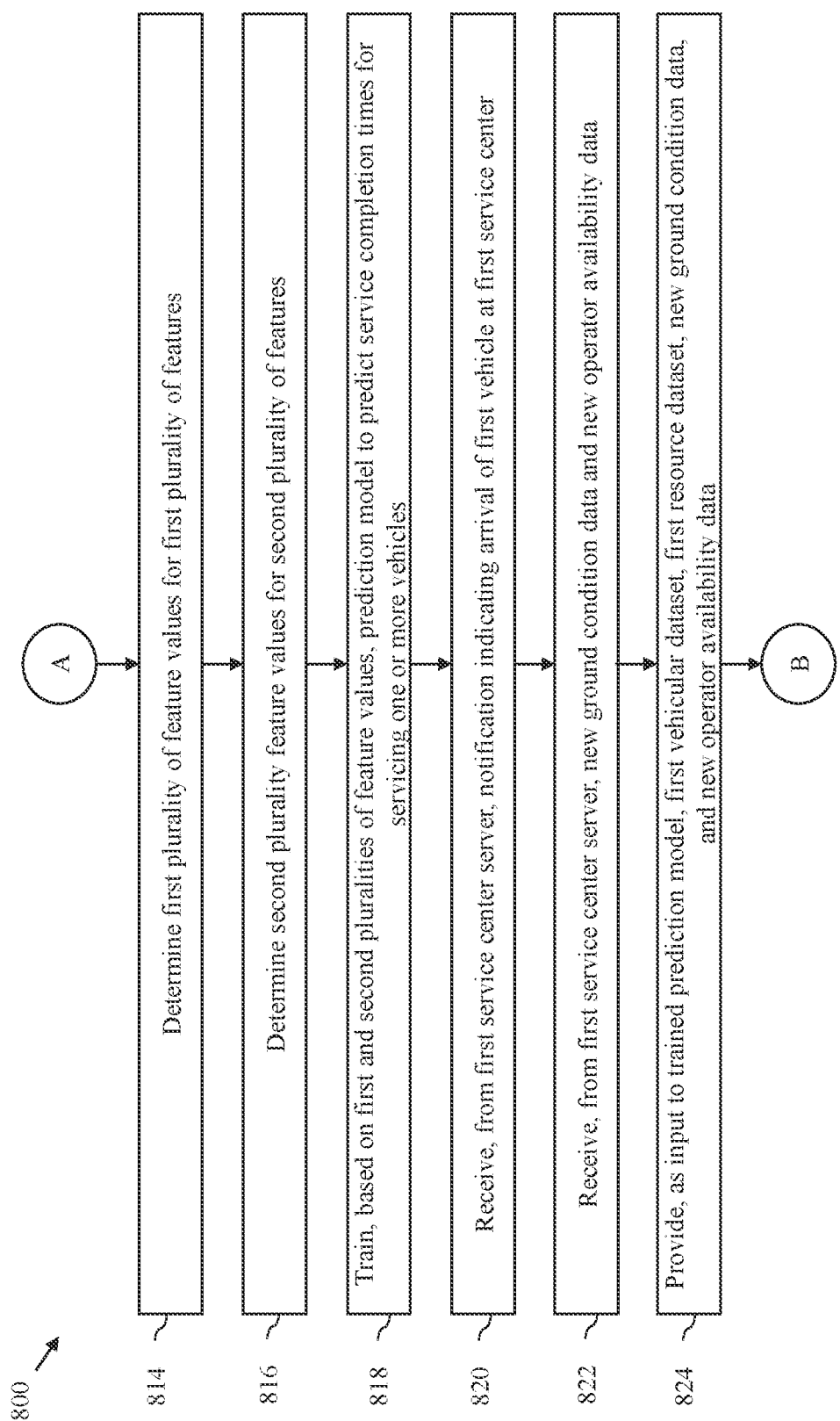

PREDICTION OF SERVICE COMPLETION TIME FOR VEHICLE SERVICE

CROSS-RELATED APPLICATIONS

This application claims priority of Indian Non-Provisional Application No. 202041057229, filed Dec. 30, 2020, the contents of which are incorporated herein by reference.

FIELD

Various embodiments of the disclosure relate generally to vehicle maintenance. More specifically, various embodiments of the disclosure relate to methods and systems for predicting service completion times for servicing vehicles at service centers.

BACKGROUND

Transportation constitutes an important aspect of the modern world. For transport, individuals may utilize various types of vehicles or automobiles such as motorbikes, autorickshaws, cars, buses, trucks, or the like. Modern vehicles (e.g. cars) are complex machines that include various vehicular systems such as air-conditioning (AC) systems, braking systems, suspension systems, or the like. These vehicles require periodic servicing to ensure satisfactory operation of corresponding vehicular systems and safety of passengers travelling in these vehicles.

For servicing, vehicles may be required to be brought to a service center (i.e., a workshop or a garage). The service center may employ technicians for servicing the vehicles. At any given point in time, multiple vehicles may be present at the service center awaiting service. Therefore, a vehicle brought to the service center for servicing may not immediately be serviced by the technicians. Typically, no assurances are offered to the vehicle owners on when the servicing of the vehicle will commence or be complete. Further, even in cases where an estimated service completion time or delivery time is provided to the vehicle owner, the technicians fail or are unable to comply with the assured service completion time. This leads to undesirable experience for the vehicle owner, requiring the vehicle owner to repeatedly follow-up with the service center to get the vehicle serviced. Delays in the service completion or delivery time may have deep ramifications (e.g., loss in earnings) for the vehicle owner if the vehicle is required for business purposes (e.g., on-demand cab services, delivery of goods, or the like). As a result, many owners or transport aggregators avoid or delay servicing their vehicles, compromising the safety and convenience of passengers traveling in the vehicles.

In light of the foregoing, there exists a need for a technical and reliable solution that overcomes the abovementioned problems and ensures effective prediction of service completion times for servicing vehicles at a service center.

SUMMARY

Methods and systems for facilitating vehicle servicing are provided substantially as shown in, and described in connection with, at least one of the figures, as set forth more completely in the claims.

These and other features and advantages of the present disclosure may be appreciated from a review of the following detailed description of the present disclosure, along with the accompanying figures in which like reference numerals refer to like parts throughout.

BRIEF DESCRIPTION OF DRAWINGS

FIGS. 8A-8C collectively, represent a flow chart that illustrates a method for facilitating servicing of vehicles at service centers, in accordance with an exemplary embodiment of the present disclosure;

DETAILED DESCRIPTION OF EMBODIMENTS

Figure 1:
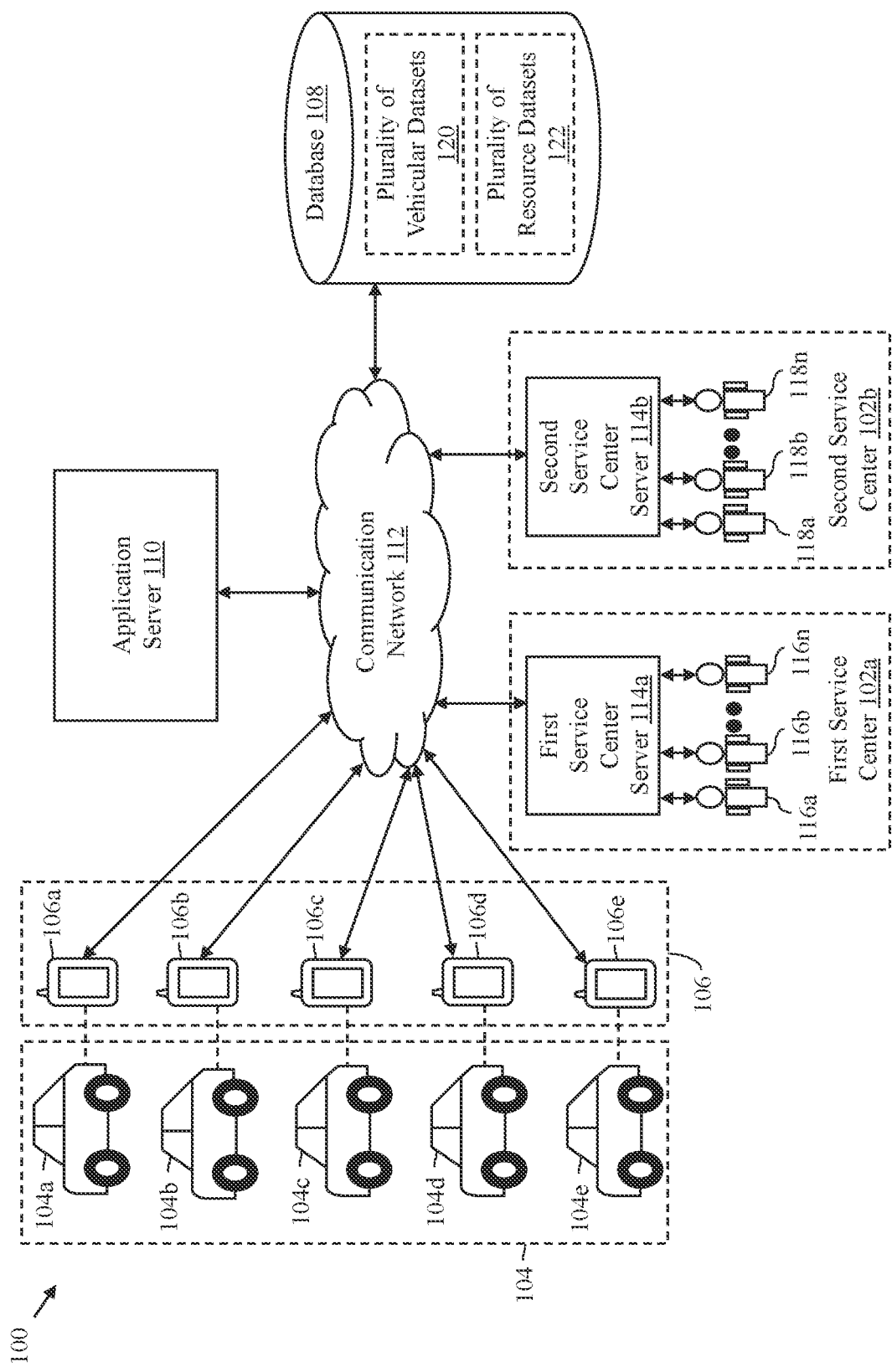
FIG. 1 is a block diagram that illustrates a system environment for facilitating vehicle servicing, in accordance with an exemplary embodiment of the present disclosure.

Certain embodiments of the disclosure may be found in the disclosed systems and methods for facilitating vehicle servicing. Exemplary aspects of the disclosure provide methods for facilitating vehicle servicing. The methods include various operations that are executed by a server (for example, an application server) for facilitating vehicle servicing at a service center. In an embodiment, a first plurality of feature values corresponding to a first plurality of features may be determined, by a server, for each vehicle of a plurality of vehicles, based on a vehicular dataset of a corresponding vehicle. The plurality of vehicles have been serviced at a plurality of service centers in past. For each service center of the plurality of service centers, a second plurality of feature values corresponding to a second plurality of features may be determined, by the server, based on a resource dataset of a corresponding service center. The second plurality of features include at least a maximum time duration, a minimum time duration, and a median time duration for vehicle servicing at a service center. The resource dataset of each service center includes a service history of the corresponding service center. Based on the first and second pluralities of feature values, a machine learning model is trained, by the server, to predict service completion times for servicing one or more vehicles. A first vehicular dataset of a first vehicle is provided, by the server, as input to the machine learning model. The machine learning model predicts a service completion time for servicing the first vehicle at a first service center based on the inputted first vehicular dataset. The first vehicle is serviced at the first service center in compliance with the predicted service completion time.

In some embodiments, a first resource dataset associated with the first service center is further provided, by the server, to the trained machine learning model as input. The prediction of the service completion time is further based on the inputted first resource dataset.

In some embodiments, the first plurality of features include at least two or more of a cumulative distance travelled by a vehicle, an age of a vehicle, a make and model of a vehicle, a fuel type of a vehicle, a geographical location of a vehicle, or a deviation of a vehicle from a service schedule. The first plurality of features further include at least two or more of a historical usage pattern of a vehicle, a count of days since a previous scheduled service of a vehicle, a count of days since a previous unscheduled service of a vehicle, a set of repair operations performed on a vehicle, or a count of accidents associated with a vehicle. The first plurality of features further include at least two or more of a distance travelled by a vehicle between a set of consecutive scheduled services, a count of unscheduled repairs of a vehicle between the set of consecutive scheduled services, or a total distance travelled by a vehicle since a previous unscheduled service. The first plurality of features further include at least two or more of a current cost per unit distance of operating a vehicle, a forecasted cost per unit distance of operating a vehicle, a current asset health index of a vehicle, a forecasted asset health index of a vehicle, a cumulative cost of repairing a set of historical faults in a vehicle, or a cumulative cost associated with a set of historical scheduled services of a vehicle. The first plurality of features further include at least two or more of a service completion time associated with each historical scheduled service of a vehicle, a repair time associated with each historical repair session of a vehicle, a cost of each historical scheduled service of a vehicle, a cost of each historical unscheduled service of a vehicle, or a cost of each historical repair session of a vehicle. The first plurality of features further include at least two or more of a count of accidents associated with a vehicle after a previous scheduled service, a count of accidents associated with a vehicle after a previous unscheduled service, or a mean time between failures associated with each of a set of vehicular components in a vehicle. The second plurality of features further include a work schedule and a holiday schedule of each operator in a service center and a level of workmanship of each operator in a service center.

In some embodiments, a cost of servicing the first vehicle at each of one or more service centers of the plurality of service centers may be determined by the server. the one or more service centers include the first service center. The first vehicle is allocated, by the server, to the first service center based on the determined cost of servicing the first vehicle at each of the one or more service centers. The first vehicle arrives at the first service center for servicing based on the allocation of the first vehicle to the first service center. In some embodiments, an availability of a set of spare components at each of the one or more service centers is determined, by the server, for servicing the first vehicle. The first vehicle is allocated to the first service center for servicing further based on the determined availability of the set of spare components at each of the one or more service centers In some embodiments, a notification indicating an arrival of the first vehicle at the first service center is received by the server. The first vehicular dataset is inputted to the trained machine learning model based on the reception of the notification.

In some embodiments, set of diagnostic reports corresponding to servicing of the plurality of vehicles at the plurality of service centers is received by the server. The set of diagnostic reports is analyzed, by the server, using a set of natural language processing techniques. A portion of the service history of each service center is determined, by the server, based on the analysis of the set of diagnosis reports.

In some embodiments, a plurality of operations to be performed on the first vehicle is determined, by the server, for servicing the first vehicle at the first service center. A set of prevailing ground conditions at the first service center is identified, by the server, when the first vehicle arrives at the first service center for servicing. Based on the identified set of prevailing ground conditions, a sequence in which the plurality of operations are to be performed on the first vehicle is determined, by the server, for complying with the predicted service completion time.

FIG. 1 is a block diagram that illustrates a system environment for facilitating vehicle servicing, in accordance with an exemplary embodiment of the present disclosure. Referring to FIG. 1, there is shown a system environment 100 that includes first and second service centers 102a and 102b and first through fifth vehicles 104a-104e associated with first through fifth driver devices 106a-106e, respectively. The system environment 100 further includes a database 108 and an application server 110. The first through fifth driver devices 106a-106e, the database 108, and the application server 110 communicate with each other by way of a communication network 112. Hereinafter, the first and second service centers 102a and 102b and the first through fifth vehicles 104a-104e are collectively referred to and designated as "plurality of service centers 102" and "plurality of vehicles 104", respectively. Hereinafter, the first through fifth driver devices 106a-106e are collectively referred to and designated as "plurality of driver devices 106".

The first service center 102a is a service and maintenance facility (e.g., a garage or a workshop), where vehicles (e.g., the plurality of vehicles 104) are serviced. The first service center 102a includes a first service center server 114a. For the sake of brevity, terms "service and "service session" are used interchangeably throughout the disclosure. The first service center server 114a may include suitable logic, circuitry, interfaces, and/or code, executable by the circuitry, that may be configured to perform one or more operations for facilitating servicing of vehicles (e.g., the plurality of vehicles 104) at the first service center 102a. For example, the first service center server 114a may be configured to store (i.e., record) service data (e.g., diagnostic reports) associated with service sessions (e.g., scheduled service sessions or unscheduled service sessions) of each vehicle (e.g., the plurality of vehicles 104) at the first service center 102a. Functions of the first service center server 114a are explained in detail in conjunction with FIG. 2B. The service data associated with a service session of a vehicle (e.g., any of the plurality of vehicles 104) may include information pertaining to a time of visit of the vehicle at the first service center 102a, a condition of the vehicle when the vehicle arrived for service, a condition of the vehicle post-service, any issues or faults diagnosed in the vehicle during servicing, a set of remedial (e.g., service or repair) actions taken to rectify the diagnosed issues or faults, or the like. In other words, the service data of the plurality of vehicles 104 may be indicative of a pre-service condition of each of the plurality of vehicles 104, a post-service condition of each of the plurality of vehicles 104, and a set of remedial actions taken during a service session of each of the plurality of vehicles 104. The service data may further include other data pertinent to the servicing of the plurality of vehicles 104 at the first service center 102a, without deviating from the scope of the disclosure.

The vehicles (e.g., the plurality of vehicles 104) may be serviced and/or repaired by operators (e.g., operators 116a-116n) at the first service center 102a. Hereinafter, the operators 116a-116n are collectively referred to and designated as "the first set of operators 116". The first service center 102a may be operated by an original equipment manufacturer (OEM), an entity associated with the OEM, or a third-party service provider (e.g., a transport aggregator). Functions and operations of the first service center 102a are well known to those of skill in the art. The second service center 102b may be similar to the first service center 102a. The second service center 102b may include a second service center server 114b. The second service center server 114b may be functionally similar to the first service center server 114a. Vehicles (e.g., the plurality of vehicles 104) may be serviced and/or repaired by operators (e.g., operators 118a-118n) at the second service center 102b. Hereinafter, the operators 118a-118n at the second service center 102b are collectively referred to and designated as "the second set of operators 118".

The first vehicle 104a is a mode of transport that is utilized by a user (such as a driver or an owner of the first vehicle 104a), to commute from one location to another location. In one embodiment, the first vehicle 104a may be deployed by a service provider, such as a transport aggregator, to provide on-demand vehicle services to one or more users (i.e., customers or passengers). In another embodiment, the first vehicle 104a may be privately owned by the user and may be used for fulfilling self-travelling requirements. The first vehicle 104a may include, therein, a plurality of vehicular systems. The plurality of vehicular systems may include, but is not limited to, an air-conditioning system, a braking system, an ignition system, an in-car entertainment (ICE) system, a lubrication system, an exhaust system, a suspension system, a first system, or the like. The plurality of vehicular systems may further include a lighting system, an electrical system, a radiator, a turbocharger, a traction control system, an engine, a drivetrain, or the like. The plurality of vehicular systems included in the first vehicle 104a are well known to those of skill in the art.

The first vehicle 104a may further include a plurality of sensors for measuring a health status of the plurality of vehicular systems. The plurality of sensors may include, but are not limited to, position sensors, position switches, limit switches, current sensors, voltage sensors, force sensors, pressure sensors, speed sensors, motor control sensors, airflow sensors, or the like. For example, the engine in the first vehicle 104a may be equipped with a set of fuel rail pressure sensors, a set of crankshaft position sensors, a set of camshaft position sensors, or the like. In another example, the suspension system of the first vehicle 104a may include linear position sensors, potentiometers, proximity switches, magneto-restrictive sensors, or the like. Output from each sensor of the plurality of sensors may be communicated, via the communication network 112, by an on-board diagnostics (OBD) device (not shown) to the database 108 for storage. In some embodiments, based on the sensor output of each of the plurality of sensors, one or more diagnostic trouble codes (DTCs) may be generated by an electronic control unit (ECU) in the first vehicle 104a. The one or more DTCs may be communicated, via the communication network 112, to the database 108 by the OBD device.

In one embodiment, the second through fifth vehicles 104b-104e may be structurally and functionally similar to the first vehicle 104a. In another embodiment, the first through fifth vehicles 104a-104e may vary in terms of vehicle age, vehicle manufacturer, vehicle type, vehicle model, vehicle make, or the like. Examples of the plurality of vehicles 104 may include, but are not limited to, motorcycles, auto-rickshaws, cars, trucks, buses, recreational vehicles, or the like.

The first driver device 106a may include suitable logic, circuitry, interfaces, and/or code, executable by the circuitry, that may be operable by a driver of the first vehicle 104a. The first driver device 106a may be configured to receive bookings from various users for catering to travel demands of the various users. In one embodiment, the first driver device 106a may be equipped with a global positioning system (GPS) sensor that enables real-time location tracking of the first vehicle 104a when the first vehicle 104a travels between various locations for catering to the travel demands of the various users. The first driver device 106a may communicate booking data to the database 108 for storing, therein. The booking data of the first vehicle 104a may include various parameters that indicate day-to-day operations of the first vehicle 104a for catering to travel demand of the users. In other words, booking data of a vehicle (e.g., the first vehicle 104a) may encompass data associated with the vehicle when the vehicle is being driven to cater to travel needs of the one or more users.

The booking data of the first vehicle 104a may be indicative of information pertaining to a dry run distance travelled by the first vehicle 104a, a trip distance travelled by the first vehicle 104a, an excess distance travelled by the first vehicle 104a. The booking data of the first vehicle 104a may be further indicative of information pertaining to a total distance travelled per day by the first vehicle 104a and an average total distance travelled per day by the first vehicle 104a. In one embodiment, the database 108 may receive, in real-time or near real-time, the booking data of the first vehicle 104a from the first driver device 106a. The booking data of the first vehicle 104a may further indicate past bookings of the first vehicle 104a and scheduled bookings of the first vehicle 104a.

In one embodiment, the first driver device 106a may be communicatively coupled to the OBD device in the first vehicle 104a. In such an embodiment, the first driver device 106a may communicate, to the database 108, the sensor output of each sensor in the first vehicle 104a and the one or more DTCs generated by the ECU in the first vehicle 104a. Examples of the first driver device 106a may include a mobile phone, a smartphone, a smartwatch, a laptop, a tablet, a phablet, or the like. The second through fifth driver devices 106b-106e may be functionally similar to the first driver device 106a.

The database 108 may include suitable logic, circuitry, interfaces, and/or code, executable by the circuitry, that may be configured to perform one or more database operations. Examples of the database operations include, but are not limited to, receiving, storing, processing, and transmitting vehicular datasets of vehicles (e.g., the plurality of vehicles 104) and resource datasets of service centers (e.g., the plurality of service centers 102). In one embodiment, the database 108 may store vehicular datasets of each vehicle operated by a transport aggregator. The database 108 is shown to store a plurality of vehicular datasets 120 and a plurality of resource datasets 122.

A vehicular dataset of a vehicle (e.g., any of the plurality of vehicles 104) may include, but is not limited to, an asset health index of the vehicle, a probability of failure of each vehicular system or component in the vehicle, an estimated running cost per unit distance of the vehicle, a driver score of a driver associated with the vehicle, or the like. The vehicular dataset of the vehicle may further include booking data of the vehicle, a service schedule of the vehicle, a service history of the vehicle, trip data of the vehicle, an odometer reading of the vehicle, a manufacturing date of the vehicle, an age of the vehicle, or the like. The vehicular dataset of the vehicle may further include an output of each sensor of a plurality of sensors in the vehicle, a set of DTCs generated by an ECU in the vehicle, or the like. The vehicular dataset of the vehicle may further include a service procedure for servicing the vehicle (i.e., each vehicular system or component in the vehicle). Data stored in the vehicular dataset may be received by the database 108 from multiple sources, such as the application server 110, an OBD device in the vehicle, a driver device (e.g., the first driver device 106a) in the vehicle, a computing system of the manufacturer of the vehicle, a computing system of a third-party, or the like. The vehicular dataset of the vehicle may be mapped to a vehicle identification number (VIN) of the vehicle or a vehicle registration number on a vehicle registration plate of the vehicle. The plurality of vehicular datasets 120 may include first through fifth vehicular datasets of the first through fifth vehicles 104a-104e. Each vehicular dataset of the plurality of vehicular datasets 120 may be similar to the vehicular dataset described in the foregoing.

A resource dataset of a service center (e.g., any of the plurality of service centers 102) may include service center information of the service center, a service history of the service center, and operator profiles of operators (e.g., the first set of operators 116) associated with the service center. Service center information of the service center may include, but is not limited to, a count of operators associated with the service center, a count of bays in the service center, a type (e.g., inspection bay, painting bay, or the like) of each bay in the service center, a total capacity of the service center, or the like. Operator profile of an operator (e.g., the operator 116a in the first service center 102a) may include, but is not limited to, a work schedule and a holiday schedule of the operator, a number of vehicles serviced by the operator, one or more areas of expertise (i.e., skill areas) of the operator, a workmanship rating of the operator, or the like. Service history of a service center (e.g., the first service center 102a and the second service center 102b) may include, but is not limited to, a time taken to service each of the plurality of vehicles 104 at the service center in the past, a cost of servicing each of the plurality of vehicles 104 at the service center, a rating provided by a driver of each of the plurality of vehicles 104 for servicing a corresponding vehicle at the service center, or the like. The plurality of resource datasets 122 may include first and second resource datasets of the first and second service centers 102a and 102b. Each resource dataset of the plurality of resource datasets 122 may be similar to the resource dataset described in the foregoing. For the sake of brevity, the terms "number" and "count" are used interchangeably throughout the disclosure.

Examples of the database 108 may include, but are not limited to, Hadoop®, MongoDB®, MySQL®, NoSQL®, and Oracle®. In a non-limiting example, the database 108 is shown to be maintained outside the plurality of service centers 102. However, it will be apparent to those of skill in the art that the database 108 may be maintained locally at the plurality of service centers 102 without deviating from the scope of the disclosure.

The application server 110 may include suitable logic, circuitry, interfaces, and/or code, executable by the circuitry, that may be configured to perform one or more operations for facilitating servicing of vehicles (e.g., the plurality of vehicles 104) at service centers (e.g., the plurality of service centers 102). The application server 110 may be configured to receive service requests from driver devices (e.g., the plurality of driver devices 106) for servicing corresponding vehicles and allocate the corresponding vehicles to the service centers for servicing. The application server 110 may be further configured to predict (i.e., determine) service completion times for servicing the corresponding vehicles at the service centers, when the corresponding vehicles arrive at the service centers for servicing. The application server 110 may store, therein, a prediction model for predicting or determining the service completion times for servicing the corresponding vehicles at the service centers.

Examples of the application server 110 and the first and second service center servers 114a and 114b may include, but are not limited to, a personal computer, a laptop, a mini-computer, a mainframe computer, a cloud-based server, a network of computer systems, or a non-transient and tangible machine executing a machine-readable code. In a non-limiting example, the application server 110 is shown to be a standalone entity. However, it will be apparent to those of skill in the art that the application server 110 may be implemented at any of the first and second service centers 102a and 102b without deviating from the scope of the disclosure. For the sake of brevity, the application server 110 and the database 108 have been shown as separate systems. However, in some embodiments, the database 108 may be integrated within the application server 110. In such scenarios, functions performed by the database 108 may be performed by the application server 110 without deviating from the scope of the disclosure.

In operation, the application server 110 may retrieve, from the database 108, the plurality of vehicular datasets 120 and the plurality of resource datasets 122. The plurality of vehicular datasets 120 may include the first through fifth vehicular datasets 120 corresponding to the first through fifth vehicles 104a-104e, respectively. The plurality of resource datasets 122 may include the first and second resource datasets 122 corresponding to the first and second service centers 102a and 102b, respectively. The application server 110 may be configured to utilize the plurality of vehicular datasets 120 and the plurality of resource datasets 122 for training the prediction model to predict service completion times for servicing one or more vehicles at a service center. Examples of the prediction model may include regression models such as, but not limited to, a least absolute shrinkage and selection operator (LASSO) model, a ridge model, a polynomial regression model, a gradient boosting regressor model, an XGBoost regressor model, or the like. Examples of the prediction model may further include an ensemble model that is a combination of aforementioned regression models.

Prior to training the prediction model, the application server 110 may use feature selection and/or feature engineering techniques to analyze the plurality of vehicular datasets 120 and the plurality of resource datasets 122. Based on the analysis of the plurality of vehicular datasets 120, the application server 110 may determine a first plurality of features that affect service completion times of service sessions of vehicles at service centers. Each of the first plurality of features may have a high degree of correlation or a causal relationship with the service completion times. Based on the analysis of the plurality of resource datasets 122, the application server 110 may determine a second plurality of features that affect service completion times of service sessions of vehicles at service centers. Each of the second plurality of features may have a high degree of correlation or a causal relationship with the service completion times. The feature or variable selection techniques may include various statistical techniques such as, but not limited to, Theil's U, Spearman's correlation, Pearson's correlation, variance inflation factor, analysis of variance (ANOVA), or logarithmic scaling.

Each feature of the first and second pluralities of features may be associated with a corresponding weight that is indicative of an extent to which the feature is correlated with service completion times for service sessions of vehicles. The application server 110 may, based on the first through fifth vehicular datasets 120, determine, for each of the plurality of vehicles 104, a first plurality of feature values corresponding to the first plurality of features. It is assumed that the plurality of vehicles 104 have been serviced at the plurality of service centers 102 in the past. The application server 110 may, based on the first and second resource datasets 122, further determine, for each of the plurality of service centers 102, a second plurality of feature values corresponding to the second plurality of features. The second plurality of features may include at least a maximum time duration, a minimum time duration, and a median time duration for servicing each of the first through fifth vehicles 104a-104e at a service center. Each of the first and second resource datasets 122 may include the service history of the corresponding first and second service centers 102a and 102b, respectively.

The application server 110 may train the prediction model to predict service completion times for servicing vehicles at a service center. Service completion time for a vehicle (i.e., estimated delivery date and time of the vehicle post-service) at a service center may be a function of a service time and a wait time (starting from a time of arrival of the corresponding vehicle at the service center) for a corresponding vehicle. In an example, a service time for a vehicle is indicative of a time duration required by an operator for performing a plurality of operations on the vehicle for servicing the vehicle. A wait time for the vehicle is indicative of a time duration the vehicle spends waiting at the service center before the plurality of operations is initiated on the vehicle by an operator. In such a scenario, a service completion time for the vehicle is a sum of the service time and the wait time. The prediction model may be trained to predict the wait time and the service time and, thereby, the service completion time for any vehicle, of the plurality of vehicles 104, at any service center of the plurality of service centers 102. For the sake of brevity, the terms "wait time' and "waiting time" are used interchangeably throughout the disclosure.

Following the training of the prediction model, the application server 110 may receive, from a driver device (e.g., the first driver device 106a), a service request for servicing a vehicle (e.g., the first vehicle 104a). Based on the received service request and a vehicular dataset (e.g., the first vehicular dataset) corresponding to the first vehicle 104a, the application server 110 may determine a plurality of operations to be performed on the first vehicle 104a for servicing the first vehicle 104a. The application server 110 may further determine, based on the determined plurality of operations, an availability of set of spare components, for servicing the first vehicle 104a, at each of the plurality of service centers 102. Further, the application server 110 may determine a cost of servicing the first vehicle 104a at each of the plurality of service centers 102, based on the determined plurality of operations. Based on the determined cost of servicing and the availability of the set of spare components at each of the plurality of service centers 102, the application server 110 may allocate the first vehicle 104a to one of the plurality of service centers 102 (e.g., the first service center 102a) for servicing.

Based on the allocation of the first vehicle 104a to the first service center 102a, the first vehicle 104a may arrive at the first service center 102a for servicing. Upon the arrival of the first vehicle 104a at the first service center 102a, the application server 110 may receive, from the first service center server 114a, a notification indicating the arrival of the first vehicle 104a at the first service center 102a. The application server 110 may further receive, from the first service center server 114a, ground condition data indicative of a set of prevailing ground conditions at the first service center 102a when the first vehicle 104a arrives at the first service center 102a for servicing. In other words, the application server 110 may identify the set of prevailing ground conditions at the first service center 102a, based on the received ground condition data.

Based on the reception of the notification, the application server 110 may provide the first vehicular dataset of the first vehicle 104a and the first resource dataset of the first service center 102a as input to the trained prediction model. Based on the provided input, the trained prediction model may predict a service completion time for servicing the first vehicle 104a at the first service center 102a. Based on the predicted service completion time and the set of prevailing ground conditions, the application server 110 may determine a sequence in which the plurality of operations are to be performed on the first vehicle 104a at the first service center 102a for complying with the predicted service completion time. The application server 110 may communicate the determined sequence to the first service center server 114a. The first vehicle 104a may be serviced at the first service center 102a in compliance with the predicted service completion time, based on the determined sequence received by the first service center server 114a from the application server 110.

Figure 2A:
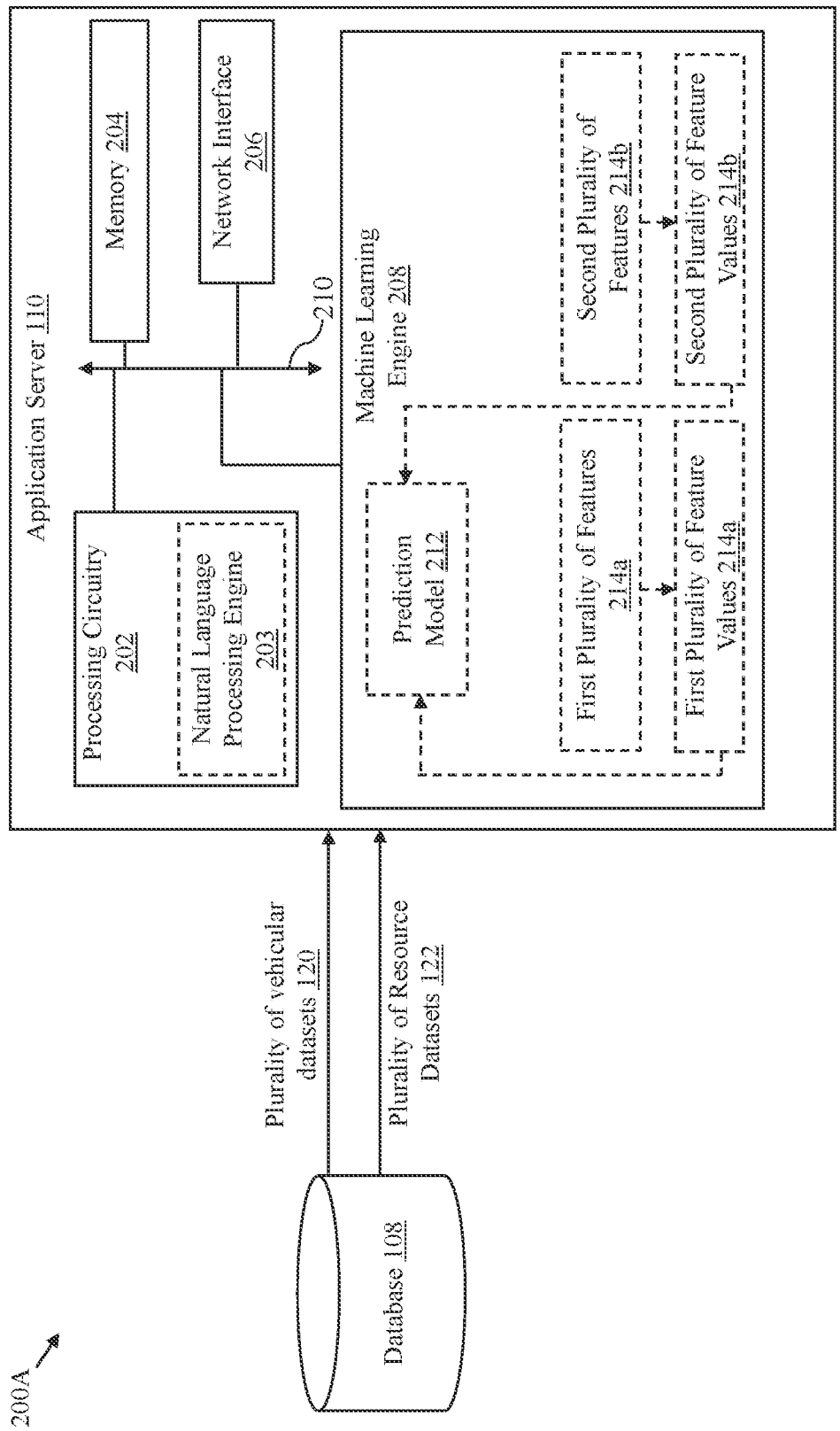
FIG. 2A is a schematic diagram that illustrates an exemplary scenario for training a prediction model to predict service completion times for vehicles, in accordance with an exemplary embodiment of the disclosure.

FIG. 2A is a schematic diagram that illustrates an exemplary scenario 200A for training the prediction model to predict service completion times for vehicles, in accordance with an exemplary embodiment of the disclosure. The application server 110 may include processing circuitry 202, a memory 204, a network interface 206, and a machine learning engine 208. The processing circuitry 202, the memory 204, the network interface 206, and the machine learning engine 208 communicate by way of a communication bus 210.

The processing circuitry 202 may include suitable logic, circuitry, interfaces, and/or code, executable by the circuitry, that may be configured to execute the instructions stored in the memory 204 to perform various operations for allocating service centers to vehicles and enabling prediction of service completion times for vehicles. The processing circuitry 202 may be configured to perform various operations associated with data collection and data processing. The processing circuitry 202 may include a natural language processing (NLP) engine 203 that is configured to process and analyze a set of diagnostic reports that correspond to past servicing of vehicles by the plurality of service centers 102. The NLP engine 203 may analyze the set of diagnostic reports, using various NLP techniques such as, but not limited to, topic modeling, sentiment analysis, aspect mining, named entity recognition, or the like. The processing circuitry 202 may determine a portion of the service history of each of the plurality of service centers 102, based on the analysis of the set of diagnostic reports by the NLP engine 203. The processing circuitry 202 may be implemented by one or more processors, such as, but not limited to, an application-specific integrated circuit (ASIC) processor, a reduced instruction set computing (RISC) processor, a complex instruction set computing (CISC) processor, and a field-programmable gate array (FPGA) processor. The one or more processors may also correspond to central processing units (CPUs), graphics processing units (GPUs), network processing units (NPUs), digital signal processors (DSPs), or the like. It will be apparent to a person of ordinary skill in the art that the processing circuitry 202 may be compatible with multiple operating systems.

The memory 204 may include suitable logic, circuitry, and interfaces that may be configured to store one or more instructions which when executed by the processing circuitry 202 cause the processing circuitry 202 to perform various operations for allocating service centers to vehicles and enabling prediction of service completion times for servicing the vehicles. The memory 204 may be accessible by the processing circuitry 202, the machine learning engine 208, and the prediction model 212. Examples of the memory 204 may include, but are not limited to, a random-access memory (RAM), a read only memory (ROM), a removable storage drive, a hard disk drive (HDD), a flash memory, a solid-state memory, or the like. It will be apparent to a person skilled in the art that the scope of the disclosure is not limited to realizing the memory 204 in the application server 110, as described herein. In another embodiment, the memory 204 may be realized in the form of a database or a cloud storage working in conjunction with the application server 110, without departing from the scope of the disclosure.

The network interface 206 may include suitable logic, circuitry, interfaces, and/or code, executable by the circuitry, that may be configured to enable the application server 110 to communicate with the plurality of driver devices 106, the database 108, and the first and second service center servers 114a and 114b. The network interface 206 may be implemented as a hardware, software, firmware, or a combination thereof. Examples of the network interface 206 may include a network interface card, a physical port, a network interface device, an antenna, a radio frequency transceiver, a wireless transceiver, an Ethernet port, a universal serial bus (USB) port, or the like.

The machine learning engine 208 may include suitable logic, circuitry, interfaces, and/or code, executable by the circuitry, that may be configured to perform one or more operations for predicting service completion times for servicing of the plurality of vehicles 104. Examples of the machine learning engine 208 may include, but are not limited to, an ASIC processor, a RISC processor, a CISC processor, and an FPGA processor. The machine learning engine 208 may also correspond to a CPU, a GPU, an NPU, a DSP, or the like. It will be apparent to a person of ordinary skill in the art that the machine learning engine 208 may be compatible with multiple operating systems. Further, the machine learning engine 208 may implement any suitable machine-learning techniques, statistical techniques, or probabilistic techniques for performing the one or more operations associated with the training of the prediction model (hereinafter, referred to as "the prediction model 212").

Figure 3:
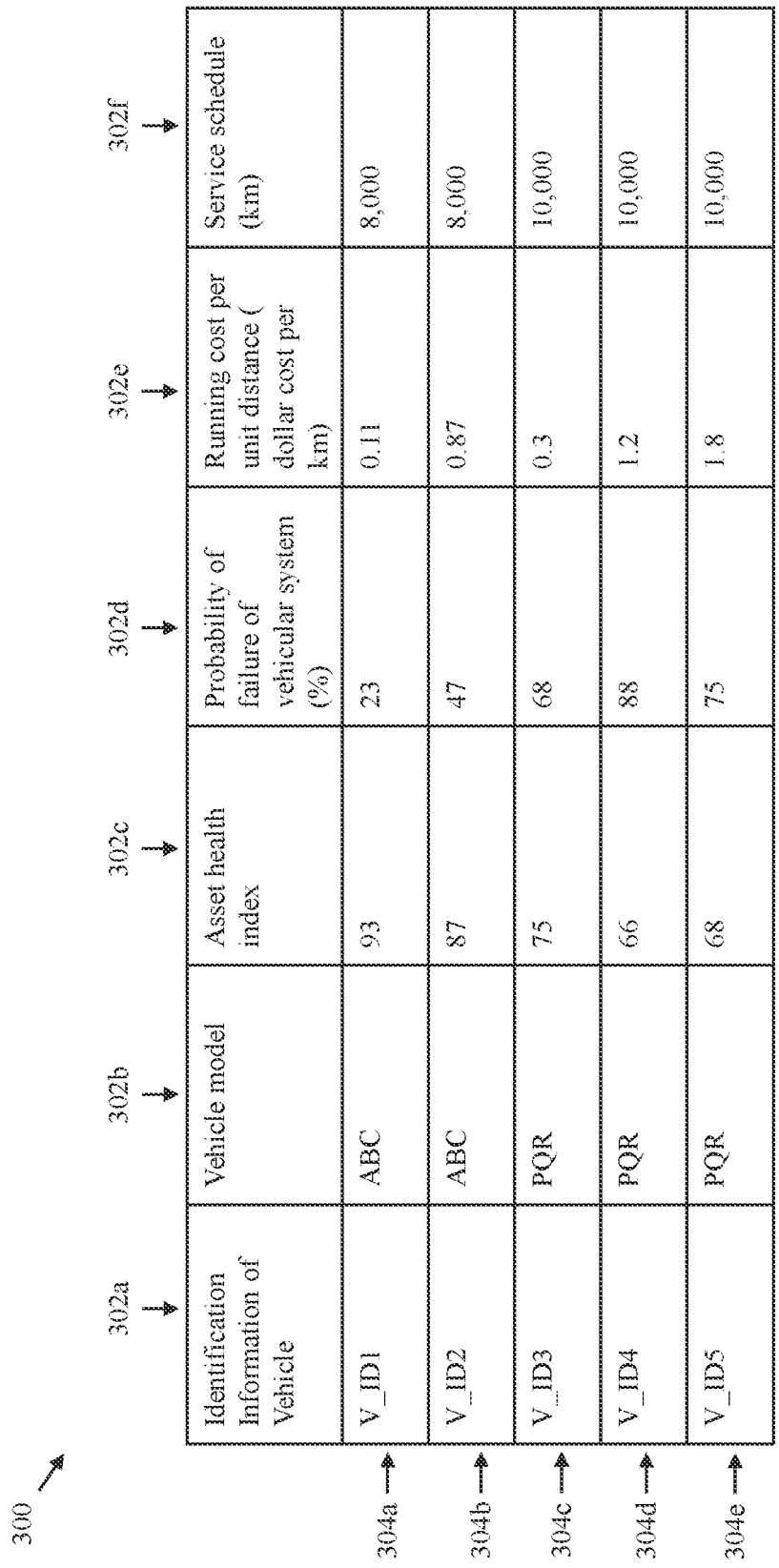
FIG. 3 is a Table that illustrates a plurality of vehicular datasets, in accordance with an exemplary embodiment of the present disclosure.
Figure 4:
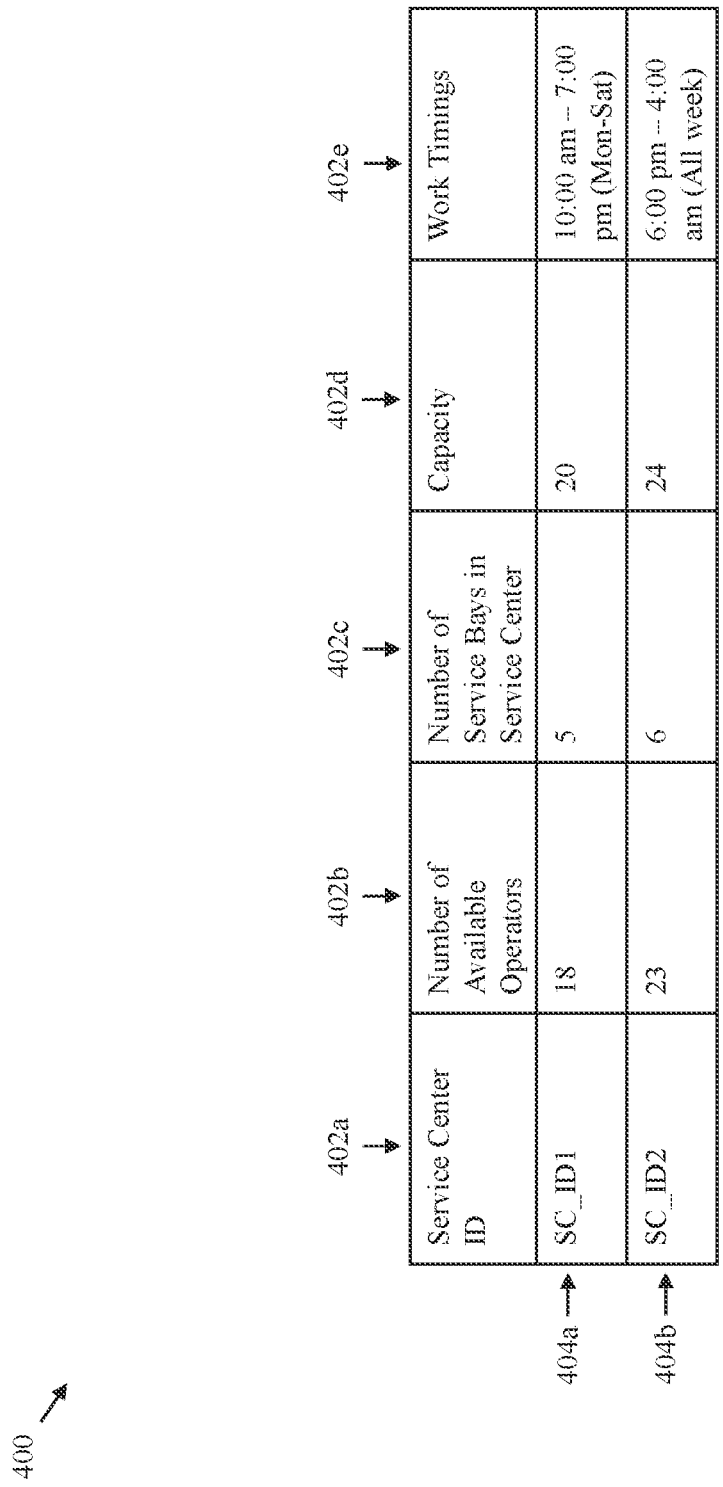
FIG. 4 is a Table that illustrates service center information of first and second service centers of FIG. 1, in accordance with an exemplary embodiment of the present disclosure.
Figure 5:
FIG. 5 is a Table that illustrates a work schedule and a holiday schedule of a first set of operators of FIG. 1, in accordance with an exemplary embodiment of the present disclosure.
Figure 6:
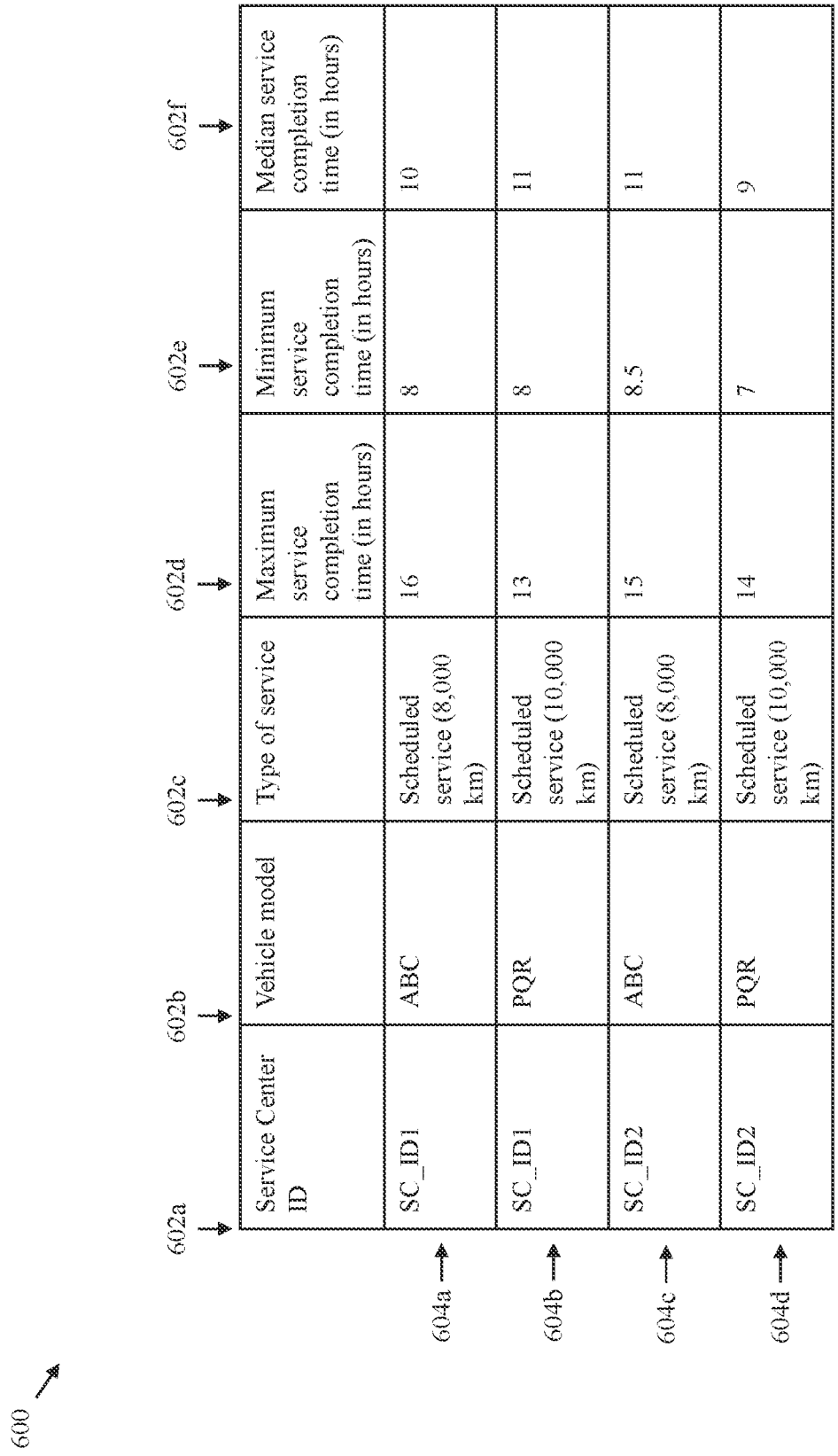
FIG. 6 is a Table that illustrates a service history of the first and second service centers, in accordance with an exemplary embodiment of the present disclosure.

When the application server 110 is operating in the training phase, the processing circuitry 202 may be configured to retrieve, from the database 108, the plurality of vehicular datasets 120 and the plurality of resource datasets 122. The machine learning engine 208 may process the plurality of vehicular datasets 120 and the plurality of resource datasets 122. The plurality of vehicular datasets 120 are shown in FIG. 3. The plurality of resource datasets 122 that include service center information of the plurality of service centers 102, the operator profiles of the first and second sets of operators 116 and 118, and service history data of the plurality of service centers 102 are shown in FIGS. 4, 5, and 6. For the sake of brevity, the terms "service history" and "service history data" are used interchangeably throughout the disclosure.

Referring now to FIG. 3, a Table 300 that illustrates the plurality of vehicular datasets 120 (i.e., the first through fifth vehicular datasets 120), in accordance with an exemplary embodiment of the present disclosure, is shown. The Table 300 includes columns 302a-302f and rows 304a-304e. The columns 302a-302c indicate identification information of the plurality of vehicles 104, a vehicle model of the plurality of vehicles 104, and an asset health index of the plurality of vehicles 104. The columns 302d-302e indicate a current probability of failure of a vehicular system (e.g., a braking system) in the plurality of vehicles 104, a running cost per unit distance of the plurality of vehicles 104, and a service schedule of the plurality of vehicles 104, respectively. The rows 304a-304e are indicative of the first through fifth vehicular datasets 120 corresponding to the first through fifth vehicles 104a-104e, respectively.

An asset health index of a vehicle (e.g., the first vehicle 104a) is indicative of an overall health status of the vehicle and is expressed as a score out of, for example, "100", a grade, a rating, or the like. A higher asset health index is indicative of a better health status of the vehicle. The asset health index of the vehicle may be a function of a health status of each vehicular system or component in the vehicle.

Probability of failure of a vehicular system (e.g., a braking system) in a vehicle (e.g., the first vehicle 104a) is indicative of a current health status of the braking system in the vehicle. In other words, higher the probability of failure of the braking system in the vehicle, higher is the likelihood that the braking system in the vehicle is currently faulty.

A current running cost per unit distance of a vehicle (e.g., the first vehicle 104a) is expressed as cost per kilometer (km) of running or operating the vehicle. The running cost per unit distance of the vehicle may be a function of a cost of servicing the vehicle, a distance that may be travelled between successive servicing sessions as scheduled by a manufacturer of the vehicle or the transport aggregator, a fuel economy of the vehicle, a fuel cost, or the like.

A service schedule of a vehicle (e.g., the first vehicle 104a) is expressed in kilometers (km) and is indicative of a future scheduled service prescribed by a manufacturer of the vehicle or the transport aggregator. In other words, the service schedule of the vehicle refers to an odometer reading (i.e., vehicle mileage) at which the vehicle is to be serviced.

The row 304a is indicative of the first vehicular dataset of the first vehicle 104a. The row 304a indicates that the first vehicle 104a is a model "ABC" that has an asset health index of "93", a probability of failure of the braking system of "23%", a running cost per unit distance (i.e., cost per km) of "$0.11", and a scheduled service (i.e., service schedule) at "8,000" km. The asset health index "93" of the first vehicle 104a implies that the first vehicle 104a is in relatively good health. The probability of failure of the braking system "23%" in the first vehicle 104a, implies that the braking system in the first vehicle 104a has a relatively low chance of failure, and is, therefore, likely to be in good health. Therefore, no servicing and/or repair of the braking system in the first vehicle 104a may currently be required. The scheduled service of the first vehicle 104a indicates that the first vehicle 104a is to be serviced when it covers a total of "8,000" km.

The row 304b is indicative of the second vehicular dataset of the second vehicle 104b. The row 304b indicates that the second vehicle 104b is a model "ABC" that has an asset health index of "87", a probability of failure of a braking system of "47%", a running cost per unit distance (i.e., cost per km) of "$0.87", and a scheduled service (i.e., service schedule) at "8,000" km. The asset health index "87" of the second vehicle 104b implies that the second vehicle 104b is in relatively good health. The probability of failure of the braking system "47%" in the second vehicle 104b, implies that the braking system in the second vehicle 104b has a moderate chance of failure, and is, therefore, likely to be in average health. Therefore, a servicing of the braking system in the second vehicle 104b may be advisable. The scheduled service of the second vehicle 104b indicates that the second vehicle 104b is to be serviced when it covers a total of "8,000" km.

The row 304c is indicative of the third vehicular dataset of the third vehicle 104c. The row 304c indicates that the third vehicle 104c is a model "PQR" that has an asset health index of "75", a probability of failure of a braking system of "68%", a running cost per unit distance (i.e., cost per km) of "$0.3", and a scheduled service (i.e., service schedule) at "10,000" km. The asset health index "75" of the third vehicle 104c implies that the third vehicle 104c is in relatively good health. The probability of failure of the braking system "68%" in the third vehicle 104c, implies that the braking system in the third vehicle 104c has an above average chance of failure, and is, therefore, likely to be in poor health. Therefore, a servicing of the braking system in the third vehicle 104c may be advisable. The scheduled service of the third vehicle 104c indicates that the third vehicle 104c is to be serviced when it covers a total of "10,000" km.

The row 304d is indicative of the fourth vehicular dataset of the fourth vehicle 104d. The row 304d indicates that the fourth vehicle 104d is a model "PQR" that has an asset health index of "66", a probability of failure of a braking system of "88%", a running cost per unit distance (i.e., cost per km) of "$1.2", and a scheduled service (i.e., service schedule) at "10,000" km. The asset health index "66" of the fourth vehicle 104d implies that the fourth vehicle 104d is in moderate health. The probability of failure of the braking system "88%" in the fourth vehicle 104d, implies that the braking system in the fourth vehicle 104d has a high chance of failure, and is, therefore, likely to be in poor health. Therefore, a servicing or repair of the braking system in the fourth vehicle 104d may be advisable. The scheduled service of the fourth vehicle 104d indicates that the fourth vehicle 104d is to be serviced when it covers a total of "10,000" km.

The row 304e is indicative of the fifth vehicular dataset of the fifth vehicle 104e. The row 304e indicates that the fifth vehicle 104e is a model "PQR" that has an asset health index of "68", a probability of failure of a braking system of "75%", a running cost per unit distance (i.e., cost per km) of "$1.8", and a scheduled service (i.e., service schedule) at "10,000" km. The asset health index "68" of the fifth vehicle 104e implies that the fifth vehicle 104e is in moderate health. The probability of failure of the braking system "75%" in the fifth vehicle 104e, implies that the braking system in the fifth vehicle 104e has a high chance of failure, and is, therefore, likely to be in poor health. Therefore, a servicing of the braking system in the fifth vehicle 104e may be advisable. The service schedule of the fifth vehicle 104e indicates that the fifth vehicle 104e is to be serviced when it covers a total of "10,000" km.

It will be apparent to those of skill in the art that the first through fifth vehicular datasets 120 shown in the Table 300 are merely exemplary and that the first through fifth vehicular datasets 120 may include other information (e.g., probabilities of failure of other vehicular systems, service history of corresponding vehicles, generated DTCs, booking data, driver scores, or the like) as described in the foregoing description of FIG. 1. For the sake of brevity, only a current asset health index, a current running cost per unit distance, and a current probability of failure of the braking system of each vehicle, of the plurality of vehicles 104, is shown in FIG. 3. In an actual implementation, each vehicular dataset may further include an asset health index, a running cost per unit distance, a probability of failure of a braking system corresponding to past time-instances (e.g., a time-instance before each previous scheduled service session, a time-instance after each previous scheduled service session, a time-instance before each unscheduled service session, or the like). However, for the sake of brevity, this information has not been shown in FIG. 3.

Referring now to FIG. 4, a Table 400 that illustrates the service center information of the first and second service centers 102a and 102b, in accordance with an exemplary embodiment of the present disclosure, is shown. The Table 400 includes columns 402a-402f and rows 404a and 404b. The columns 402a-402c indicate service center identification information of the plurality of service centers 102, a number of available operators at the plurality of service centers 102, and a number of service bays in the plurality of service centers 102. The columns 402d and 402e indicate a capacity of the plurality of service centers 102 and work timings of the plurality of service centers 102. The rows 404a and 404b are indicative of the first through fifth vehicular datasets 120 corresponding to the first through fifth vehicles 104a-104e, respectively.

A service bay in a service center is a portion of the service center used for housing vehicles (e.g., the plurality of vehicles 104) during servicing and/or repair of the vehicles. Each service bay may be able to accommodate one or more vehicles. However, in a non-limiting example, it is assumed that each service bay may accommodate a maximum of four vehicles, simultaneously. A capacity of a service center is a maximum count of vehicles that can be simultaneously serviced at the service center, given that there are no resource constraints (i.e., no shortage of operators). Capacity of a service center is a function of a count of bays in the service center and a maximum count of vehicles that can be simultaneously accommodated by each service bay in the service center. Therefore, the capacity of the service center is a product of the count of bays in the service center and the maximum count of vehicles that can be simultaneously accommodated by each service bay in the service center. Timings of a service center indicate a time slot or time duration for which the service center is available for receiving and servicing vehicles.

The row 404a is indicative of first service center information of the first service center 102a. The row 404a indicates that the first service center 102a has "18" operators, "5" service bays, and a capacity of "20" (20=5*4) vehicles. The row 404a further indicates that the first service center 102a operates (i.e., working hours) between 10:00 am and 07:00 pm on Mondays to Saturdays, implying that no vehicles are received or serviced on Sundays.

The row 404b is indicative of second service center information of the second service center 102b. The row 404b indicates that the second service center 102b has "23" operators, "6" service bays, and a capacity of "24" (24=6*4) vehicles. The row 404b further indicates that the second service center 102b operates (i.e., working hours) between 06:00 pm and 4:00 am every day.

Therefore, the first service center 102a is shown to function in day time, while the second service center 102b is shown to function at night time. In another embodiment, the plurality of service centers 102 may include a set of service centers that are open twenty-four hours a day and/or seven days a week. In some embodiments, certain servicing or repair services (e.g., painting, wheel alignment, or the like) may be performed at a service center during specific time slots in a day. For example, the first service center 102a may offer, to vehicles at the first service center 102a, a painting service only from 12:00 pm to 3:00 pm on Mondays to Saturdays.

The first and second service center information may further include ratings for corresponding service centers. A rating for a service center (e.g., the first service center 102a) may be a function (e.g., an average rating) of ratings provided by drivers based on corresponding service experiences at the service center. However, for the sake of brevity, this information has not been shown in FIG. 4.

It will be apparent to those of skill in the art that the first and second service center information shown in the Table 400 is merely exemplary and that the first and second service center information may include other information (e.g., a type of each bay included in the plurality of service centers 102, or the like) as described in the foregoing description of FIG. 1.

Referring back to FIG. 2A. the plurality of resource datasets 122 (i.e., the first and second resource datasets 122) may further include the operator profiles of the first and second sets of operators 116 and 118, respectively. Each operator profile may be indicative of a past and future availability of the first and second sets of operators 116 and 118. Availability of an operator is indicative of a presence of an operator at a service center for servicing vehicles at the service center. Past availability of an operator at a service center (e.g., the first service center 102a) indicates dates and time-durations for which the operator was available, in the past, at the service center for servicing vehicles. Future availability of an operator at a service center includes a work schedule and a holiday schedule (e.g., planned leaves) of the operator. Each operator profile may further include a workmanship rating of an operator, an area of expertise of the operator, a level of expertise of the operator, a count of vehicles serviced by the operator, or the like. However, for the sake of brevity, this information has not been shown in FIG. 5.

Referring now to FIG. 5, a Table 500 that illustrates a work schedule and a holiday schedule of the first set of operators 116, in accordance with an exemplary embodiment of the present disclosure, is shown. For the sake of brevity, the Table 500 illustrates the holiday and work schedule of only four operators. In an actual implementation, the Table 500 may illustrate the work schedule and the holiday schedule of all the operators included in the first set of operators 116. The Table 500 includes columns 502a-502f and rows 504a-504d. The columns 502a-502f indicate an availability of each operator on a set of days (here, 24 Jun. 2020-28 Jun. 2020). The rows 504a-504d are indicative of the availability of each of the first set of operators 116 at the first service center 102a, respectively. In other words, the rows 504a-504d indicate days on which each operator, of the first set of operators 116, was available or unavailable for servicing vehicles at the first service center 102a.

The row 504a is indicative of the availability of the operator 116a. The row 504a indicates that the operator 116a was available on 24th-26th June, but unavailable on 27th and 28th June.

The row 504b is indicative of the availability of the second operator 116b. The row 504b indicates that the second operator 116b was available on 24th-26th June, but unavailable on 27th and 28th June.

The row 504c is indicative of the availability of the third operator 116c. The row 504c indicates that the third operator 116c was available on 24th and 26th June, but unavailable on 25th, 27th, and 28th June.

The row 504d is indicative of the availability of the fourth operator 116d. The row 504d indicates that the fourth operator 116d was available on 24th-26th June and 28th June, but unavailable on 27th June. Each of the operators 116a-116d has been shown as unavailable on the 27th of June, based on the 27th of being a Sunday and Sunday being a non-working day for the first service center 102a.

For the sake of brevity, it is assumed that the table 500 indicates a past availability/unavailability of the first set of operators 116 at the first service center 102a. Unavailability (i.e., absence) of an operator may be due to planned leaves of the operator, unplanned leaves (e.g., sick leaves) of the operator, closure of the first service center 102a due to weekly holidays (e.g., Sundays) or festivals, or the like. In an embodiment, operator profiles may further indicate a future availability of corresponding operators at the first and second service centers 102a and 102b. For example, a first operator profile may indicate that an operator, of the first set of operators 116, will not available on the 23 Dec. 2020, based on leave application submitted by the operator. Similarly, the first operator profile may further indicate that the operator, of the first set of operators 116, will not available on the 25 Dec. 2020, owing to closure of the first service center 102a on account of Christmas. Similarly, the first operator profile may further indicate that the operator, of the first set of operators 116, is expected to be available on the 24 Dec. 2020, since no leave application for the 24 Dec. 2020 was submitted by the operator. While the first operator profile may indicate an availability of the operator on a future date (e.g., 24 Dec. 2020), an actual availability of the operator of the operator may not be known until the future date.

Referring back to FIG. 2A, the NLP engine 203 may process and analyze a set of diagnostic reports corresponding to each of the first and second service centers 102a and 102b (i.e., the plurality of service centers 102). The set of diagnostic reports may be included in the plurality of resource datasets 122. Each diagnostic report may correspond to a previous service session of a vehicle (e.g., the plurality of vehicles 104) at the plurality of service centers 102.

Each diagnostic report may include data that indicates an assessment, by a driver, of a health status of a vehicle (e.g., the plurality of vehicles 104) or one or more vehicular systems or components in the vehicle. The assessment of the health status, by the driver, may correspond to a time-instance prior to a servicing or inspection of the vehicle at a service center (e.g., the first service center 102*a*). The assessment of the health status may indicate a set of symptoms, exhibited by the one or more vehicular systems or components and observed by the driver. The indicated set of symptoms may act as a proxy for a condition (e.g., poor, good, average condition, or the like) of each of the one or more vehicular systems or components. For example, the set of symptoms may be indicative of poor braking efficacy of the vehicle, as observed by the driver of the vehicle. Similarly, the set of symptoms may be indicative of poor efficacy of an air conditioning system in the vehicle. The assessment of the health status (i.e., data included in diagnostic report) may include comments by the driver, regarding the health status of the vehicle, in a textual format (e.g., comments in English, Spanish, or the like). For example, the assessment of the health status may include a comment—"Noise generated while braking".

Each diagnostic report may further include data that describes work (e.g., inspection work or actual servicing work) done by one or more operators, field engineers, or service advisors for servicing a corresponding vehicle at a corresponding service center. For the sake of brevity, the terms "operator", "field engineer", and "service advisor" are used interchangeably throughout the disclosure. Each diagnostic report may include text (e.g., comments) that describes a condition (e.g., excellent, good, fair, average, poor, or the like), as assessed by an operator (or field engineer or service advisor), of each vehicular system or component in the corresponding vehicle during an inspection of the corresponding vehicle prior to servicing. For example, a first diagnostic report may include text (e.g., comments) that indicates a condition (e.g., poor) of the braking system in the first vehicle 104*a*, as assessed by an operator at the first service center 102*a*, prior to the servicing of the first vehicle 104*a* (i.e., during an inspection of the first vehicle 104*a*). The first diagnostic report may further indicate (by way of comments from a corresponding operator) a set of remedial measures (e.g., refilling of brake fluid, replacement of brake pads, or the like) taken by an operator to rectify, during the servicing of the first vehicle 104*a*, the poor condition of the braking system in the first vehicle 104*a*. Each diagnostic report may be computer-generated (e.g., generated by the application server 110, the first service center server 114*a*, or the like) or manually prepared by an operator or a service advisor at a corresponding service center.

Each diagnostic report may further indicate a time taken for completing each type of service (e.g., scheduled service sessions or unscheduled service sessions) for each vehicle (e.g., vehicles that correspond to models "ABC' and "PQR" shown in FIG. 3) in the past. Examples of scheduled service sessions include, but are not limited to, a "10,000" km service, a "30,000" km service, or the like. Examples of unscheduled service sessions include, but are not limited to, a service or repair required due to a frontal-impact accident, a service or repair required due to a rear-impact accident, a service or repair required due to vehicle breakdown, or the like. In some embodiments, each diagnostic report may further include ground condition data indicating a set of prevailing ground conditions during or prior to a servicing of each vehicle by a corresponding service center of the plurality of service centers 102. Examples of ground condition data include, but are not limited to, a time of arrival of a vehicle at a service center for servicing, a time duration spent by the vehicle waiting at the service center prior to the initiation of the servicing of the vehicle at the service center, a count of other vehicles present in queue for servicing at the service center, a level of occupancy of a set of bays in the service center, or the like.

In one embodiment, the NLP engine 203 may extract, from the each of the set of diagnostic reports, a set of textual elements. The set of textual elements, extracted from each diagnostic report, may include comments from a corresponding driver regarding an assessment of a health status of a corresponding vehicle by the corresponding driver. The set of textual elements, extracted from each diagnostic report, may further include comments from corresponding operators regarding a condition (i.e., a health) of the corresponding vehicle before and after servicing of the corresponding vehicle. The set of textual elements, extracted from each diagnostic report, may further include comments from the corresponding operators regarding a set of operations performed to service the corresponding and time taken to service the corresponding vehicle. The NLP engine 203 may analyze (e.g., sentiment analysis) the set of textual elements extracted from each diagnostic report to ascertain a context and/or a meaning of the set of textual elements. The NLP engine 203 may convert into a set of numerical values (e.g., vector values) the analyzed set of textual elements, extracted from each diagnostic report. The set of numerical values may be indicative of the set of textual elements included in each of the set of diagnostic reports. The conversion of the set of textual elements into the set of numerical values may be achieved using various techniques known in the art such as, but not limited to, global vectors for word representation (GloVe), n-gram models, bigram models, unigram models, or the like.

Referring now to FIG. 6, a Table 600 that illustrates the service history of the first and second service centers 102*a* and 102*b*, in accordance with an exemplary embodiment of the present disclosure, is shown. The table 600 includes columns 602*a*-602*f* and rows 604*a* and 604*b*. The columns 602*a*-602*d* indicate a vehicle model of the plurality of vehicles 104, a type of service performed for the plurality of vehicles 104, and a maximum service time duration taken to perform the type of service to the plurality of vehicles 104. The columns 602*e* and 602*f* indicate a minimum service time duration taken to perform the type of service to the plurality of vehicles 104 and a median service time duration taken to perform the type of service to the plurality of vehicles 104.

The row 604*a* indicates that, at the first service center 102*a*, a maximum time duration (i.e., maximum service completion time) of "16" hours was taken to perform an "8,000" km scheduled service for vehicles corresponding to vehicle model "ABC". The row 604*a* further indicates that, at the first service center 102*a*, a minimum time duration of "8" hours was taken to perform an "8,000" km scheduled service for vehicles corresponding to the vehicle model "ABC". The row 604*a* further indicates that, at the first service center 102*a*, a median time duration of "10" hours was taken to perform an "8,000" km scheduled service for vehicles corresponding to the vehicle model "ABC".

The row 604*b* indicates that, at the first service center 102*a*, a maximum time duration of "13" hours was taken to perform an "10,000" km scheduled service for vehicles corresponding to vehicle model "PQR". The row 604b further indicates that, at the first service center 102a, a minimum time duration of "8" hours was taken to perform an "10,000" km scheduled service for vehicles corresponding to the vehicle model "PQR". The row 604b further indicates that, at the first service center 102a, a median time duration of "11" hours was taken to perform an "10,000" km scheduled service for vehicles corresponding to the vehicle model "PQR".

The row 604c indicates that, at the second service center 102b, a maximum time duration of "15" hours was taken to perform an "8,000" km scheduled service for vehicles corresponding to vehicle model "ABC". The row 604c further indicates that, at the second service center 102b, a minimum time duration of "8.5" hours was taken to perform an "8,000" km scheduled service for vehicles corresponding to the vehicle model "ABC". The row 604c further indicates that, at the second service center 102b, a median time duration of "9" hours was taken to perform an "8,000" km scheduled service for vehicles corresponding to the vehicle model "ABC".

The row 604d indicates that, at the second service center 102b, a maximum time duration of "14" hours was taken to perform an "10,000" km scheduled service for vehicles corresponding to vehicle model "PQR". The row 604d further indicates that, at the first service center 102a, a minimum time duration of "7" hours was taken to perform an "10,000" km scheduled service for vehicles corresponding to the vehicle model "PQR". The row 604d further indicates that, at the first service center 102a, a median time duration of "9" hours was taken to perform an "10,000" km scheduled service for vehicles corresponding to the vehicle model "PQR".

Data shown in Table 600 (i.e., portions of the service history of the first and second service centers 102a and 102b) may be determined by the application server 110, based on the analysis of the set of diagnostic reports by the NLP engine 203. It will be apparent to those of skill in the art that data shown in FIG. 6 is merely exemplary. In an actual implementation, the Table 600 may further illustrate more data such as, but not limited to, minimum, maximum, and median time durations for various types of service sessions (e.g., unscheduled service sessions, "50,000" km service sessions, or the like).

Referring back to FIG. 2A, the machine learning engine 208 may use the feature selection techniques and/or the feature engineering techniques to analyze the plurality of vehicular datasets 120 and the plurality of resource datasets 122, and determine the first and second pluralities of features (as described in the foregoing description of FIG. 1). Hereinafter, the first and second pluralities of features are referred to and designated as "the first plurality of features 214a" and "the second plurality of features 214b", respectively. Each of the determined first and second pluralities of features 214a and 214b may have a high degree of correlation or a causal relationship with the service completion time for a vehicle.

Each feature of the first and second pluralities of features 214a and 214b may be associated with a corresponding weight that is indicative of an extent to which the feature is correlated with the service completion time of a vehicle. The application server 110 processes the plurality of vehicular datasets 120 to determine, for each of the plurality of vehicles 104, the first plurality of feature values (hereinafter, referred to as "the first plurality of feature values 216a") for the first plurality of features 214a. For example, the application server 110 may determine, for the first vehicle 104a, based on the first vehicular dataset, a plurality of feature values for each feature of the first plurality of features 214a.

In an embodiment, the first plurality of features 214a determined by the machine learning engine 208 may include a cumulative distance travelled by a vehicle. In such an embodiment, the first plurality of feature values 216a may include a cumulative (i.e., total) distance travelled by each of the plurality of vehicles 104. The cumulative distance travelled by a vehicle may correspond to a current odometer reading of the vehicle. A low odometer reading may indicate that the vehicle is relatively new, thereby indicating that a relatively small number of vehicular components in the vehicle may require repair and/or servicing. A high odometer reading may indicate that the vehicle is relatively old, thereby indicating that a significant number of vehicular components in the vehicle may require servicing. A vehicle with high number of vehicular components requiring servicing may be associated with a higher service time, leading to a higher service completion time. A vehicle with less number of vehicular components requiring servicing may be associated with a lower service time, leading to a lower service completion time.

In an embodiment, the first plurality of features 214a determined by the machine learning engine 208 may include an age of a vehicle. In such an embodiment, the first plurality of feature values 216a may include the age of each of the plurality of vehicles 104. The age of a vehicle may correspond to a time duration that has elapsed since a registration of the vehicle. A low age of a vehicle may indicate that the vehicle is relatively new, thereby indicating that a relatively small count of vehicular components in the vehicle may require repair and/or servicing. A high age of a vehicle may indicate that the vehicle is relatively old, thereby indicating that a significant count of vehicular components in the vehicle may require servicing. A vehicle with a high count of vehicular components requiring servicing may be associated with a higher service time, leading to a higher service completion time for the vehicle. A vehicle with less count of vehicular systems requiring servicing may be associated with a lower service time, leading to a lower service completion time for the vehicle.

In an embodiment, the first plurality of features 214a determined by the machine learning engine 208 may include a make and model of a vehicle. In such an embodiment, the first plurality of feature values 216a may include a make and model of each of the plurality of vehicles 104. Vehicles of various makes and models may be associated with different manufacturer-mandated servicing procedures. Further, vehicles of various makes and models may be associated with differing failure rates for vehicular systems or components therein. For example, vehicular systems (e.g., braking system, air conditioning system, or the like) in vehicles manufactured by a first manufacturer may be more prone to failure than vehicular components in vehicles manufactured by a second manufacturer. As a result, the vehicles manufactured by the second manufacturer may be associated with a lower service time, leading to a lower service completion time of the vehicles manufactured by the second manufacturer.

In an embodiment, the first plurality of features 214a determined by the machine learning engine 208 may include a fuel type of a vehicle. In such an embodiment, the first plurality of feature values 216a may include a fuel type of each of the plurality of vehicles 104. The fuel type of a vehicle may correspond to one of petrol, diesel, electric, petrol-hybrid, diesel-hybrid, compressed natural gas, liquified petroleum gas, or the like. For example, a vehicle that runs on electricity may have a lower service time in comparison to a vehicle that runs on petrol or diesel, leading to a lower service completion time for the vehicle running on electricity.

In an embodiment, the first plurality of features 214a determined by the machine learning engine 208 may include a geographical location (i.e., a region of operation) of a vehicle. In such an embodiment, the first plurality of feature values 216a may include the geographical location of each of the plurality of vehicles 104. Geographical location or region of operation of a vehicle refers to an area (e.g., a city, a portion of a city, a district, or the like) where the vehicle is predominantly driven. In some scenarios, the geographical location of the vehicle may be associated with road conditions (e.g., potholed roads) or driving conditions (e.g., heavy rainfall) that may cause excessive wear and tear in various vehicular systems (e.g., suspension system) or components in the vehicle. Service completion time for servicing the vehicle, operating in the geographical location with less-conducive driving conditions, may be higher due to a requirement for servicing and/or repairing the various vehicular systems.

In an embodiment, the first plurality of features 214a determined by the machine learning engine 208 may include a deviation of a vehicle from a service schedule. In such an embodiment, the first plurality of feature values 216a may include deviation of each of the plurality of vehicles 104 from a corresponding service schedule. The service schedule of a vehicle may indicate frequency at which the vehicle is to be serviced, as defined by a corresponding vehicle manufacturer or the transport aggregator. In one embodiment, the service schedule of the vehicle may be dynamic in nature. In other words, the service schedule may not be subject to any rigid service intervals (e.g., every "10,000" km, every "5,000" km, or the like). In a non-limiting example, the service schedule (i.e., a scheduled service session) for the vehicle may be dynamically determined based on a probability of failure of each vehicular system or component in the vehicle, a driver score of a driver of the vehicle, or the like. Deviation from a service schedule refers to an extent to which a scheduled service session has been delayed for a vehicle. For example, if the application server 110 determines that the first vehicle 104a is to be serviced at "30,000" km (i.e., scheduled service session), and the first vehicle 104a arrives at a service center (e.g., the first service center 102a) for the scheduled service session with an odometer reading of "35,000" km, the deviation of the first vehicle 104a from the service schedule equals "5,000" km. In other words, the scheduled service session for the first vehicle 104a is delayed by "5,000" km. A vehicle with a high deviation from a corresponding service schedule may be assigned a lower priority level when the vehicle arrives at a service center for servicing, increasing a wait time of the vehicle at the service center. A vehicle with a low deviation from a corresponding service schedule may be assigned a higher priority level when the vehicle arrives at a service center for servicing, decreasing a wait time of the vehicle at the service center.

In an embodiment, the first plurality of features 214a determined by the machine learning engine 208 may include a historical usage pattern of a vehicle. In such an embodiment, the first plurality of feature values 216a may include the historical usage pattern of each of the plurality of vehicles 104. The historical usage pattern of a vehicle may be indicative of a total distance travelled by the vehicle over a time duration (e.g., daily, weekly, or monthly), an average distance travelled by the vehicle over a time duration (e.g., daily, weekly, or monthly), or a combination thereof.

In an embodiment, the first plurality of features 214a determined by the machine learning engine 208 may include a count of unscheduled service sessions of a vehicle. In such an embodiment, the first plurality of feature values 216a may include the count of unscheduled service sessions of each of the plurality of vehicles 104. The count of unscheduled service sessions of a vehicle refers to a number of unscheduled service sessions required to keep the vehicle functioning. The count of unscheduled service sessions is further indicative of a number of times the vehicle has been damaged to an extent that it had to be repaired and maintained immediately. For example, the first vehicle 104a may be four years old and may have undergone "5" scheduled service sessions in the four years of use. However as per records of the first vehicle 104a, the first vehicle 104a has undergone "10" service sessions. Thus, the count of unscheduled service sessions for the first vehicle 104a is five (i.e., 10−5=5). A vehicle with a high count of unscheduled service sessions may be assigned a low priority level, that may increase a waiting time of the vehicle at a service center (e.g., the first service center 102a) when the vehicle arrives at the service center for servicing, thereby, leading to a higher service completion time for the vehicle. Similarly, a vehicle with a low count of unscheduled service sessions may be a assigned a high priority level, that may decrease a waiting time of the vehicle at a service center (e.g., the first service center 102a) when the vehicle arrives at the service center for servicing.

In an embodiment, the first plurality of features 214a determined by the machine learning engine 208 may include a count of days since a previous scheduled service session of a vehicle. In such an embodiment, the first plurality of feature values 216a may include the count of days since a previous scheduled service session of each of the plurality of vehicles 104. The count of days refers to a number of days that have passed since a previous scheduled service session was performed to keep the vehicle functioning. The count of days since the previous scheduled service session is further indicative of time duration for which the vehicle has been driven without damaging the vehicle to an extent that it requires immediate repair or servicing. A vehicle with a low count of days since a previous scheduled service session may be assigned a lower priority level, that may increase a waiting time of the vehicle at a service center (e.g., the first service center 102a) when the vehicle arrives at the service center for servicing, thereby, leading to a higher service completion time for the vehicle. Similarly, a vehicle with a high count of days since a previous scheduled service session may be a assigned a high priority level, that may decrease a waiting time of the vehicle at a service center (e.g., the first service center 102a) when the vehicle arrives at the service center for servicing.

In an embodiment, the first plurality of features 214a determined by the machine learning engine 208 may include a count of days since a previous unscheduled service session of a vehicle. In such an embodiment, the first plurality of feature values 216a may include the count of days since a previous unscheduled service session of each of the plurality of vehicles 104. The count of days refers to a number of days that have passed since a previous unscheduled service session was performed to keep the vehicle functioning. The count of days since the previous unscheduled service session is further indicative of time duration for which the vehicle has been driven without damaging the vehicle to an extent that it requires immediate repair or servicing. A vehicle with a low count of days since a previous unscheduled service session may be assigned a lower priority level, that may increase a waiting time of the vehicle at a service center (e.g., the first service center 102a) when the vehicle arrives at the service center for servicing, thereby, leading to a higher service completion time for the vehicle. Similarly, a vehicle with a high count of days since a previous unscheduled service session may be a assigned a high priority level, that may decrease a waiting time of the vehicle at a service center (e.g., the first service center 102a) when the vehicle arrives at the service center for servicing.

In an embodiment, the first plurality of features 214a determined by the machine learning engine 208 may include a distance travelled by a vehicle since a previous unscheduled service session of the vehicle. In such an embodiment, the first plurality of feature values 216a may include the distance travelled by each of the plurality of vehicles 104 since a previous unscheduled service session. A vehicle that has travelled only a short distance since a previous unscheduled service session may be assigned a lower priority level, increasing a waiting time of the vehicle at a service center (e.g., the first service center 102a) when the vehicle arrives at the service center for servicing, thereby, leading to a higher service completion time for the vehicle. Similarly, a vehicle that has travelled a long distance since a previous unscheduled service session may be a assigned a high priority level, decreasing a waiting time of the vehicle at a service center (e.g., the first service center 102a) when the vehicle arrives at the service center for servicing.

In an embodiment, the first plurality of features 214a determined by the machine learning engine 208 may include a set of repair operations performed on a vehicle. In such an embodiment, the first plurality of feature values 216a may include the set of repair operations performed on each of the plurality of vehicles 104. Repair operations may be performed on a vehicle, during a scheduled or unscheduled service session, to repair one or more faulty vehicular systems or components in the vehicle. If multiple major repair operations (e.g., suspension repair, engine overhaul, or the like) have been performed on the vehicle, it is likely that the vehicle is in a poor condition and, therefore, may require a higher service completion time.

In an embodiment, the first plurality of features 214a determined by the machine learning engine 208 may include a count of unscheduled repairs between a set of consecutive scheduled service sessions of a vehicle. In such an embodiment, the first plurality of feature values 216a may include the count of unscheduled repairs between a set of consecutive scheduled service sessions of each of the plurality of vehicles 104. A vehicle with a high count of unscheduled repairs, between a set of consecutive scheduled service sessions, may be a assigned a lower priority level, that may increase a waiting time of the vehicle at a service center (e.g., the first service center 102a) when the vehicle arrives at the service center for servicing. Similarly, a vehicle with a high count of unscheduled repairs, between a set of consecutive scheduled service sessions, may be a assigned a high priority level, that may decrease a waiting time of the vehicle at a service center (e.g., the first service center 102a) when the vehicle arrives at the service center for servicing.

In an embodiment, the first plurality of features 214a determined by the machine learning engine 208 may include a total distance travelled by a vehicle between a set of consecutive scheduled service sessions in the past. In such an embodiment, the first plurality of feature values 216a may include the distance travelled between a set of consecutive scheduled service sessions by each of the plurality of vehicles 104. As described in the foregoing, service schedule of a vehicle may be determined dynamically based on a probability of failure of each vehicular system or component in the vehicle, a driver score of a driver of the vehicle, or the like. A higher total distance travelled by a vehicle between a set of consecutive scheduled service sessions in the past may indicate the vehicle is driven and/or maintained well. Similarly, a higher total distance travelled by a vehicle between a set of consecutive scheduled service sessions may indicate the vehicle is driven and/or maintained poorly. A vehicle with a high total distance travelled between a set of consecutive scheduled service sessions, in the past, may be assigned a higher priority level, that may decrease a waiting time of the vehicle at a service center (e.g., the first service center 102a) when the vehicle arrives at the service center for servicing. Similarly, a vehicle with a low total distance travelled between a set of consecutive scheduled service sessions, in the past, may be assigned a lower priority level, that may increase a waiting time of the vehicle at a service center (e.g., the first service center 102a) when the vehicle arrives at the service center for servicing.

In an embodiment, the first plurality of features 214a determined by the machine learning engine 208 may include a total distance travelled by a vehicle since a previous unscheduled service. In such an embodiment, the first plurality of feature values 216a may include the total distance travelled, by each of the plurality of vehicles 104, since a previous unscheduled service. The total distance travelled since the previous unscheduled service session is indicative of a distance for which the vehicle has been driven without damaging the vehicle to an extent that it requires immediate repair or servicing. A vehicle that has travelled less distance since a previous unscheduled service session may be assigned a lower priority level, increasing a waiting time of the vehicle at a service center (e.g., the first service center 102a) when the vehicle arrives at the service center for servicing, thereby, leading to a higher service completion time for the vehicle. Similarly, a vehicle that has travelled a long distance since a previous unscheduled service session may be assigned a high priority level, that may decrease a waiting time of the vehicle at a service center (e.g., the first service center 102a) when the vehicle arrives at the service center for servicing.

In an embodiment, the first plurality of features 214a determined by the machine learning engine 208 may include a current cost per unit distance of operating a vehicle. In such an embodiment, the first plurality of feature values 216a may include the current cost per unit distance of operating each of the plurality of vehicles 104. A current cost per unit distance of operating a vehicle may refer to a cost that is being incurred by virtue of operating the vehicle. For example, a high cost per unit distance of operating (i.e., keeping the vehicle running/or operational) the vehicle may indicate that the vehicle is prone to cause monetary loss to the transport aggregator or a corresponding driver. In one example, a vehicle with a high cost per unit distance of operating the vehicle may be assigned a lower priority level, that may increase a waiting time of the vehicle at a service center (e.g., the first service center 102a) when the vehicle arrives at the service center for servicing. Similarly, a vehicle with a low cost per unit distance of operating the vehicle may be assigned a higher priority level, that may decrease a waiting time of the vehicle at a service center (e.g., the first service center 102a) when the vehicle arrives at the service center for servicing.

In an embodiment, the first plurality of features 214a determined by the machine learning engine 208 may include a forecasted cost per unit distance of operating a vehicle. In such an embodiment, the first plurality of feature values 216a may include the forecasted cost per unit distance of operating each of the plurality of vehicles 104. A forecasted cost per unit distance of operating a vehicle may refer to a cost that is projected to be incurred by virtue of operating the vehicle during a future time-interval (e.g., over a period of six months after the servicing of the vehicle). The forecasted cost per unit distance for operating the vehicle may further indicate a projected cost that the transport aggregator may be required to bear for keeping the vehicle operational during the future time-interval. For example, a high cost per unit distance value incurred on one or more components of the vehicle may indicate that the vehicle is prone to cause monetary loss to the transportation service provider. In one example, the forecasted cost per unit distance may correspond to a forecasted cost per kilometer for the one or more components of the vehicle. In one example, a vehicle with a high forecasted cost per unit distance of operating the vehicle may be assigned a lower priority level, that may increase a waiting time of the vehicle at a service center (e.g., the first service center 102a) when the vehicle arrives at the service center for servicing. Similarly, a vehicle with a low forecasted cost per unit distance of operating the vehicle may be assigned a higher priority level, that may decrease a waiting time of the vehicle at a service center (e.g., the first service center 102a) when the vehicle arrives at the service center for servicing.

In an embodiment, the first plurality of features 214a determined by the machine learning engine 208 may include a current asset health index of a vehicle. In such an embodiment, the first plurality of feature values 216a may include the current asset health index of each of the plurality of vehicles 104. An asset health index of a vehicle is a collective indicator of a performance, a health, a utilization, and a profitability of the vehicle. The asset health index may be a grade, a percentage, a score, or the like provided to the vehicle based on the performance, the health, the utilization, and the profitability of the vehicle. The asset health index may be determined by the application server 110 based on a current health status of various vehicular systems (e.g., braking system, air conditioning system, engine, or the like) in the vehicle. A deterioration in the asset health index may be indicative of a frequent requirement of service by the vehicle. In one example, a vehicle with a low asset health index may be assigned a lower priority level, that may increase a waiting time of the vehicle at a service center (e.g., the first service center 102a) when the vehicle arrives at the service center for servicing. Similarly, a vehicle with a high asset health index may be assigned a higher priority level, that may decrease a waiting time of the vehicle at a service center (e.g., the first service center 102a) when the vehicle arrives at the service center for servicing.

In an embodiment, the first plurality of features 214a determined by the machine learning engine 208 may include a forecasted asset health index of a vehicle. In such an embodiment, the first plurality of feature values 216a may include the forecasted asset health index of each of the plurality of vehicles 104. The forecasted asset health index of a vehicle may correspond to an expected or predicted asset health index of the vehicle after the servicing of the vehicle. In one example, a vehicle with a low forecasted asset health index may be assigned a lower priority level, that may increase a waiting time of the vehicle at a service center (e.g., the first service center 102a) when the vehicle arrives at the service center for servicing. Similarly, a vehicle with a high forecasted asset health index may be assigned a higher priority level, that may decrease a waiting time of the vehicle at a service center (e.g., the first service center 102a) when the vehicle arrives at the service center for servicing.

In an embodiment, the first plurality of features 214a determined by the machine learning engine 208 may include a count of vehicular systems or components in a vehicle with a high probability of failure. In such an embodiment, the first plurality of feature values 216a may include the count of vehicular systems, in each of the plurality of vehicles 104, with a high probability of failure. A vehicular system or component in a vehicle is said to have a high probability of failure if a probability of failure of the vehicular system or component exceeds a pre-determined probability threshold (e.g., "0.6" or "60%"). In a non-limiting example, a vehicle having a relatively high count of vehicular components with a high probability of failure may be expected to have a higher servicing time, due to a high number of vehicular systems or components requiring repair or servicing. A vehicle having a low count of vehicular components with a high probability of failure may be expected to have a lower servicing time, due to fewer vehicular systems or components requiring repair or servicing.

In an embodiment, the first plurality of features 214a determined by the machine learning engine 208 may include a count of historical faults that have been repaired in a vehicle. In such an embodiment, the first plurality of feature values 216a may include the number of historical faults that have been repaired in each of the plurality of vehicles 104. A count of historical faults in a vehicle refers to a number of times one or more vehicular system or components in the vehicle have been repaired in order to keep the vehicle in good health. In an embodiment, the count of historical faults is indicative of a number of times the vehicle has been damaged to an extent that a repair of the one or more vehicular components of the vehicle has been performed to keep the vehicle in working state. A high count of historical faults in a vehicle is indicative of one of careless attitude of a driver of the vehicle, frequent damages being caused to the vehicle, and a bad health of the vehicle. A low count of historical faults in a vehicle is indicative of one of a good health of the vehicle, a well-maintained state of the vehicle, and a careful and attentive attitude of the driver towards the vehicle. In one example, a vehicle with a high count of historical faults may be assigned a lower priority level, that may increase a waiting time of the vehicle at a service center (e.g., the first service center 102a) when the vehicle arrives at the service center for servicing. Similarly, a vehicle with a low count of historical faults may be assigned a higher priority level, that may decrease a waiting time of the vehicle at a service center (e.g., the first service center 102a) when the vehicle arrives at the service center for servicing.

In an embodiment, the first plurality of features 214a determined by the machine learning engine 208 may include a cumulative cost associated with a set of historical scheduled services of a vehicle. In such an embodiment, the first plurality of feature values 216a may include the cumulative cost associated with a set of historical scheduled services of each of the plurality of vehicles 104. A cumulative cost associated with a set of historical scheduled services of a vehicle refers to a total amount of money expended, on scheduled services, to repair one or more vehicular systems or components in the vehicle for keeping the vehicle in good health. In an embodiment, a high cumulative cost associated with a set of historical scheduled services is indicative of poor driving or poor maintenance of the vehicle by a corresponding driver. A low cumulative cost of a set of historical scheduled services may be indicative of careful driving and appropriate maintenance of the vehicle by the corresponding driver. In one example, a vehicle with a high cumulative cost associated with a set of historical scheduled services may be assigned a lower priority level, that may increase a waiting time of the vehicle at a service center (e.g., the first service center 102a) when the vehicle arrives at the service center for servicing. Similarly, a vehicle with a low cumulative cost associated with a set of historical scheduled services may be assigned a higher priority level, that may decrease a waiting time of the vehicle at a service center (e.g., the first service center 102a) when the vehicle arrives at the service center for servicing. In an embodiment, the first plurality of features 214a determined by the machine learning engine 208 may include a cost associated of each historical scheduled service of a vehicle. In such an embodiment, the first plurality of feature values 216a may include the cost of each historical scheduled service of each of the plurality of vehicles 104. Impact of the cost of each historical scheduled service of a vehicle on service completion time may be similar to that of the cumulative cost associated with a set of historical scheduled services of the vehicle.

In an embodiment, the first plurality of features 214a determined by the machine learning engine 208 may include a cost associated of a previous scheduled service of a vehicle. In such an embodiment, the first plurality of feature values 216a may include the cost of a previous scheduled service of each of the plurality of vehicles 104. Impact of the cost of a previous scheduled service of a vehicle on service completion time may be similar to that of the cumulative cost associated with a set of historical scheduled services of the vehicle (i.e., wait time is impacted).

In an embodiment, the first plurality of features 214a determined by the machine learning engine 208 may include a total cost of last two scheduled services of a vehicle. In such an embodiment, the first plurality of feature values 216a may include the total cost of the last two scheduled services of each of the plurality of vehicles 104. Impact of the total cost of the last two scheduled services of a vehicle on service completion time may be similar to that of the cumulative cost associated with a set of historical scheduled services of the vehicle (i.e., wait time is impacted). In some embodiments, a vehicle associated with the transport aggregator may be allocated to different drivers. For example, a vehicle may be allocated to a first driver, and may be driven by the first driver for "20,000" km. The vehicle may then be allocated to a second driver (i.e., a new driver) for driving. In such a scenario, the first plurality of features 214a may further include a time or distance (i.e., recency) for which the new driver has been driving the vehicle. In a non-limiting example, a vehicle with a relatively high total cost of last two scheduled services may indicate that a corresponding driver (i.e., the new driver or the second driver) is a poor driver and that a driving style of the corresponding driver causes increased wear and tear of vehicular systems in the vehicle. Consequently, the vehicle may be assigned a low priority level, increasing a waiting time of the vehicle when the vehicle arrives at a service center (e.g., the first service center 102a) for servicing. Alternatively, a vehicle with a relatively high total cost of last two scheduled services may indicate that a previous driver of the vehicle may have been a poor driver and that a driving style of the previous driver caused increased wear and tear of vehicular systems in the vehicle. Consequently, the vehicle may be assigned a high priority level, decreasing a waiting time of the vehicle when the vehicle arrives at a service center (e.g., the first service center 102a) for servicing. Similarly, the first plurality of features 214a may include a current asset health index of a vehicle, a forecasted asset health index of a vehicle, or a driver score associated with a vehicle since a new driver has started driving the vehicle.

In an embodiment, the first plurality of features 214a determined by the machine learning engine 208 may include a cumulative cost associated with a set of historical unscheduled services of a vehicle. In such an embodiment, the first plurality of feature values 216a may include the cumulative cost associated with a set of historical unscheduled services of each of the plurality of vehicles 104. A cumulative cost associated with a set of historical unscheduled services of a vehicle refers to a total amount of money expended, on unscheduled services, to repair one or more vehicular systems or components in the vehicle for keeping the vehicle in good health. In an embodiment, a high cumulative cost associated with a set of historical unscheduled services is indicative one of careless attitude of a driver of the vehicle, frequent damages being caused to the vehicle, and a bad health of the vehicle. A low cumulative cost of a set of historical unscheduled services is indicative one of careful attitude of the driver towards the vehicle, a sedate driving style of the vehicle, and a good health of the vehicle. In one example, a vehicle with a high cumulative cost associated with a set of historical unscheduled services may be assigned a lower priority level, that may increase a waiting time of the vehicle at a service center (e.g., the first service center 102a) when the vehicle arrives at the service center for servicing. Similarly, a vehicle with a low cumulative cost associated with a set of historical unscheduled services may be assigned a higher priority level, that may decrease a waiting time of the vehicle at a service center (e.g., the first service center 102a) when the vehicle arrives at the service center for servicing. In an embodiment, the first plurality of features 214a determined by the machine learning engine 208 may include a cost associated of each historical unscheduled service of a vehicle. In such an embodiment, the first plurality of feature values 216a may include the cost of each historical unscheduled service of each of the plurality of vehicles 104. Impact of the cost of each historical unscheduled service of a vehicle on service completion time may be similar to that of the cumulative cost associated with a set of historical unscheduled services of the vehicle.

In an embodiment, the first plurality of features 214a determined by the machine learning engine 208 may include a count of historical repair sessions of a vehicle. In such an embodiment, the first plurality of feature values 216a may include the count of historical repair sessions of each of the plurality of vehicles 104. A count of historical repair sessions of a vehicle refers to a number of times one or more vehicular system or components in the vehicle have been repaired in order to keep the vehicle in good health. In an embodiment, the count of historical repair sessions is indicative of a number of times the vehicle has been damaged to an extent that a repair of the one or more vehicular components of the vehicle has been performed to keep the vehicle in working state. A high count of historical repair sessions of a vehicle is indicative of one of careless attitude of a driver of the vehicle, frequent damages being caused to the vehicle, and a bad health of the vehicle. A low count of historical repair sessions of a vehicle is indicative of one of a good health of the vehicle, a well-maintained state of the vehicle, and a careful and attentive attitude of the driver towards the vehicle. In one example, a vehicle with a high count of historical repair sessions may be assigned a lower priority level, that may increase a waiting time of the vehicle at a service center (e.g., the first service center 102a) when the vehicle arrives at the service center for servicing. Similarly, a vehicle with a low count of historical repair sessions may be assigned a higher priority level, that may decrease a waiting time of the vehicle at a service center (e.g., the first service center 102a) when the vehicle arrives at the service center for servicing. In some embodiments, the first plurality of features 214a may include a count of historical repair sessions of a vehicle per unit distance. For example, a vehicle has travelled "100,000" km and has had "10" repair sessions in the past, the count of historical repair sessions per unit distance for the vehicle equals "0.0001" repair sessions per km.

In an embodiment, the first plurality of features 214a determined by the machine learning engine 208 may include a cost of each historical repair session of a vehicle. In such an embodiment, the first plurality of feature values 216a may include the cost of each historical repair session of each of the plurality of vehicles 104. The cost of each historical repair session of a vehicle refers to amount to amount of money expended on each historical repair session to keep the vehicle in good health. In an embodiment, the cost of each historical repair session is indicative of an extent of damage, to the vehicle, that has been repaired to keep the vehicle in working state. A high cost of each historical repair session of a vehicle is indicative of one of careless attitude of a driver of the vehicle, frequent damages being caused to the vehicle, and a bad health of the vehicle. A low cost of each historical repair session of a vehicle is indicative of one of a good health of the vehicle, a well-maintained state of the vehicle, and a careful and attentive attitude of the driver towards the vehicle. In one example, a vehicle with a high cost of each historical repair session may be assigned a lower priority level, that may increase a waiting time of the vehicle at a service center (e.g., the first service center 102a) when the vehicle arrives at the service center for servicing. Similarly, a vehicle with a low cost of each historical repair session may be assigned a higher priority level, that may decrease a waiting time of the vehicle at a service center (e.g., the first service center 102a) when the vehicle arrives at the service center for servicing.

In an embodiment, the first plurality of features 214a determined by the machine learning engine 208 may include a repair time associated with each historical repair session of a vehicle. In such an embodiment, the first plurality of feature values 216a may include the repair time associated with each historical repair session of the plurality of vehicles 104. The repair time associated with a historical repair session, for a vehicle, is indicative of a severity of repairs required to keep the vehicle in a working state. A high repair time associated with each historical repair session is indicative of one of careless attitude of a driver of the vehicle, frequent damages being caused to the vehicle, and a bad health of the vehicle. A low repair time associated with each historical repair session of a vehicle is indicative of one of a good health of the vehicle, a well-maintained state of the vehicle, and a careful and attentive attitude of the driver towards the vehicle. In one example, a vehicle with a high repair time associated with each historical repair session may be assigned a lower priority level, that may increase a waiting time of the vehicle at a service center (e.g., the first service center 102a) when the vehicle arrives at the service center for servicing. Similarly, a vehicle with a low repair time associated with each historical repair session may be assigned a higher priority level, that may decrease a waiting time of the vehicle at a service center (e.g., the first service center 102a) when the vehicle arrives at the service center for servicing.

In an embodiment, the first plurality of features 214a determined by the machine learning engine 208 may include a count of accidents associated with a vehicle after a previous scheduled service. In such an embodiment, the first plurality of feature values 216a may include the count of accidents associated with each of the plurality of vehicles 104 after a previous scheduled service. Accidents may be major or minor in nature. For example, major accidents may refer to one or more accidents that have caused physical damage and performance deterioration of the vehicle. In an embodiment, a low count of major accidents of the vehicle is indicative of less damages and relatively minor performance issues caused to the vehicle due to the major accidents of the vehicle. In a non-limiting example, major accidents may be distinguished from minor accidents based on a cost associated with accidental damage repair. For example, if the cost associated with accidental damage repairs exceeds a first threshold cost, the accident of the vehicle may be considered as a major accident, and if the cost does not exceed to first threshold, the accident might be considered as a minor accident. In another embodiment, major accidents may be distinguished from minor accidents based on level of damaged caused to one or more components. For example, if damage is only caused to the headlights during the accident of the vehicle, the accident of the vehicle may be considered as a minor accident. However, if during the accident the windshield glass of the vehicle is shattered, the accident might be considered as a major accident.

The count of accidents indicates a number of times one or more vehicular systems or components in the vehicle have been damaged and/or repaired after being damaged in order to keep the vehicle in good health. In an embodiment, the count of accidents associated with a vehicle after a previous scheduled service is indicative of a number of times the vehicle has been damaged to an extent that a repair of the one or more vehicular systems or components of the vehicle has been performed to keep the vehicle in a working state. A high count of accidents in a vehicle is indicative of one of careless attitude of a driver of the vehicle, frequent damages being caused to the vehicle, and a bad health of the vehicle. A low count of accidents in a vehicle is indicative of one of a good health of the vehicle, a well-maintained state of the vehicle, and a careful and attentive attitude of the driver towards the vehicle. In one example, a vehicle with a high count of accidents, after a previous scheduled service, may be assigned a lower priority level, that may increase a waiting time of the vehicle at a service center (e.g., the first service center 102a) when the vehicle arrives at the service center for servicing. Similarly, a vehicle with a low count of accidents, after a previous scheduled service, may be assigned a higher priority level, that may decrease a waiting time of the vehicle at a service center (e.g., the first service center 102a) when the vehicle arrives at the service center for servicing.

In an embodiment, the first plurality of features 214a determined by the machine learning engine 208 may include a count of accidents associated with a vehicle after a previous unscheduled service. In such an embodiment, the first plurality of feature values 216a may include the count of accidents associated with each of the plurality of vehicles 104 after a previous unscheduled service. A count of accidents refers to a number of times one or more vehicular systems or components in the vehicle have been damaged and/or repaired after being damaged in order to keep the vehicle in good health. In an embodiment, the count of accidents associated with a vehicle after a previous unscheduled service is indicative of a number of times the vehicle has been damaged to an extent that a repair of the one or more vehicular systems or components of the vehicle has been performed to keep the vehicle in a working state. A high count of accidents in a vehicle is indicative of one of careless attitude of a driver of the vehicle, frequent damages being caused to the vehicle, and a bad health of the vehicle. A low count of accidents in a vehicle is indicative of one of a good health of the vehicle, a well-maintained state of the vehicle, and a careful and attentive attitude of the driver towards the vehicle. In one example, a vehicle with a high count of accidents, after a previous unscheduled service, may be assigned a lower priority level, that may increase a waiting time of the vehicle at a service center (e.g., the first service center 102a) when the vehicle arrives at the service center for servicing. Similarly, a vehicle with a low count of accidents, after a previous unscheduled service, may be assigned a higher priority level, that may decrease a waiting time of the vehicle at a service center (e.g., the first service center 102a) when the vehicle arrives at the service center for servicing.

In an embodiment, the first plurality of features 214a determined by the machine learning engine 208 may include a service completion time associated with each historical scheduled service of a vehicle. In such an embodiment, the first plurality of feature values 216a may include the service completion time associated with each historical scheduled service of each of the plurality of vehicles 104. If service completion time associated with each historical scheduled service of a vehicle is low, service completion times for future scheduled services may also be expected to be low. If service completion time associated with each historical scheduled service of a vehicle is high, service completion times for future scheduled services may also be expected to be high.

In an embodiment, the first plurality of features 214a determined by the machine learning engine 208 may include a repair time associated with each historical unscheduled service of a vehicle. In such an embodiment, the first plurality of feature values 216a may include the repair time associated with each historical repair session of each of the plurality of vehicles 104. If repair time associated with each historical scheduled service of a vehicle is low, service completion times for future services may also be expected to be low. If repair time associated with each historical unscheduled service of a vehicle is high, service completion times for future services may also be expected to be high.

In an embodiment, the first plurality of features 214a determined by the machine learning engine 208 may include a cost of repairing a set of historical faults in a vehicle. In such an embodiment, the first plurality of feature values 216a may include the cost of repairing a set of historical faults in each of the plurality of vehicles 104. A high cost for repairing a set of historical faults in a vehicle is indicative of one of careless attitude of a driver of the vehicle, frequent damages being caused to the vehicle, and a bad health of the vehicle. A low cost of repairing a set of historical faults in a vehicle is indicative of one of a good health of the vehicle, a well-maintained state of the vehicle, and a careful and attentive attitude of the driver towards the vehicle. In one example, a vehicle with a high cost of repairing a set of historical faults may be assigned a lower priority level, that may increase a waiting time of the vehicle at a service center (e.g., the first service center 102a) when the vehicle arrives at the service center for servicing. Similarly, a vehicle with a low cost of repairing a set of historical faults may be assigned a higher priority level, that may decrease a waiting time of the vehicle at a service center (e.g., the first service center 102a) when the vehicle arrives at the service center for servicing.

In one embodiment, the first plurality of features 214a determined by the machine learning engine 208 may include an excess distance travelled by a vehicle. In such an embodiment, the first plurality of feature values 216a may include the excess distance for each of the plurality of vehicles 104. An excess distance travelled by a vehicle refers to a distance travelled by the vehicle without having a booking or without any information to the transport aggregator. For example, a total distance travelled by the first vehicle 104a in a day may be "100" km, and as per the booking data, the first vehicle 104a may have been driven for "80" km (i.e., trip distance) to fulfill a plurality of bookings. In such a scenario, the extra "20" km that the first vehicle 104a has been driven refers to the excess distance, i.e., distance travelled without any booking. In some embodiments, a high excess distance travelled by a vehicle may cause a corresponding transport aggregator (e.g., the transport aggregator associated with the plurality of vehicles 104) to classify the vehicles as less valuable, since the corresponding transport aggregator may detect that the vehicle is driven primarily for personal use or for other transporter aggregators. In a non-limiting example, a vehicle with a high excess distance travelled may be assigned a low priority level, increasing a waiting time of the vehicle at a service center (e.g., the first service center 102a) when the vehicle arrives at the service center for servicing. Similarly, a vehicle with a low excess distance travelled may be assigned a high priority level, decreasing a waiting time of the vehicle at the service center (e.g., the first service center 102a) when the vehicle arrives at the service center for servicing.

In one embodiment, the first plurality of features 214a determined by the machine learning engine 208 may include a trip distance travelled by a vehicle. In such an embodiment, the first plurality of feature values 216a may include the trip distance for each of the plurality of vehicles 104. A trip distance travelled by the vehicle refers to a distance travelled by the vehicle for completing a booking. In a non-limiting example, a vehicle with low trip distance travelled may be assigned a low priority level, increasing a waiting time of the vehicle at a service center (e.g., the first service center 102a) when the vehicle arrives at the service center for servicing. Similarly, a vehicle with high trip distance travelled may be assigned a high priority level, decreasing a waiting time of the vehicle at a service center (e.g., the first service center 102a) when the vehicle arrives at the service center for servicing.

In one embodiment, the first plurality of features 214a determined by the machine learning engine 208 may include a dry run distance travelled by a vehicle. In such an embodiment, the first plurality of feature values 216a may include the dry run distance for each of the plurality of vehicles 104. A dry run distance travelled by the vehicle refers to a distance travelled by the vehicle for fulfilling bookings, while not having any customers in the vehicle. For example, if the vehicle at a location "A" receives a booking to pick up a customer or passenger from location "B" and the drop the customer at location "C", a distance between the locations "A" and "B" is the dry run distance travelled by the vehicle for a corresponding booking. A total distance travelled per by the vehicle refers to a sum of the dry run distance, the trip distance, and the excess distance travelled by the vehicle. For example, a total distance travelled by a vehicle in a day may be "120" km. The vehicle may have been driven for "80" km (i.e., trip distance) to fulfill a plurality of bookings. The vehicle may have been driven for "20" km (i.e., dry run distance) to pick up customers from corresponding locations (e.g., location "B"). Further, the vehicle may have been driven for "20" kilometers (i.e., excess distance) by the corresponding driver for some personal work. In one embodiment, a driver of a vehicle associated with a now number of bookings and a high dry run distance may be classified, by the transport aggregator, as a "good" or a "valuable" driver, since the driver does not hesitate to travel long distances to pickup customers and fulfil corresponding bookings. In a non-limiting example, a vehicle with a high dry run distance and a low count of bookings may be assigned a high priority level, decreasing a waiting time of the vehicle when the vehicle arrives at a service center (e.g., the first service center 102a) for servicing. Similarly, a vehicle with a low dry run distance and a high count of bookings may be assigned a low priority level, increasing a waiting time of the vehicle when the vehicle arrives at a service center (e.g., the first service center 102a) for servicing.

In one embodiment, the first plurality of features 214a determined by the machine learning engine 208 may include a count of active days of a vehicle and a deviation in a count of active days between consecutive scheduled service sessions. In such an embodiment, the first plurality of feature values 216a includes the count of active days and the deviation in the count of active days between consecutive scheduled service sessions of each of the plurality of vehicles 104.

A count of active days of a vehicle refers to a time-interval for which the vehicle has been put to use in the entire life span of the vehicle. For example, the first vehicle 104a may have been manufactured on Jul. 20, 2010 and put to use on Jul. 20, 2012. Thus, on Jul. 20, 2014, the active age of the first vehicle 104a is 730 days (i.e., two years), whereas the actual age of the first vehicle 104a is four years. Further, the count of active days of the vehicle indicates a time-interval during which the one or more components of the vehicle have been active. The count of active days of the vehicle may have a high impact on the health of the vehicle as the one or more components may have been utilized to its full capacity during the active days. In a non-limiting example, a high count of active days for a vehicle may result in a higher service time (and, thereby, a higher service completion time) for the vehicle due to high wear and tear of vehicular systems or components in the vehicle.

In some embodiments, the count of active days of a vehicle may refer to an extent of utilization (i.e., historical usage pattern) of the vehicle for fulfilling bookings received by a transport aggregator (e.g., the transport aggregator associated with the plurality of vehicles 104). For example, if the vehicle has been associated with the transport aggregator for a time period of one year, but has been available for only "90" days for fulfilling the bookings received by the transport aggregator, the count of active days for the vehicle equals "90". This indicates that the extent of utilization of the vehicle for fulfilling the bookings received by the transport aggregator is relatively low. In a non-limiting example, a vehicle with a low count of active days (i.e., low utilization) may be assigned a low priority level, increasing a waiting time of the vehicle when the vehicle arrives at a service center (e.g., the first service center 102a) for servicing. Similarly, a vehicle with a high count of active days (i.e., high utilization) may be assigned a high priority level, decreasing a waiting time of the vehicle when the vehicle arrives at the service center for servicing In an embodiment, the deviation in a count of active days between consecutive scheduled service sessions of a vehicle refers to a change in the count of active days of a vehicle between two subsequent scheduled service sessions. For example, the first vehicle 104a may have had a first scheduled service session on Jan. 10, 2020 and a second scheduled service session on Jul. 10, 2020. The first vehicle 104a may only be driven on weekdays (i.e., Monday-Friday) and put to rest on Saturday and Sunday. Thus, the number of active days between the first and second scheduled service sessions for the first vehicle 104a is 131 days. Further, the first vehicle 104a may have had a third scheduled service session on Oct. 20, 2020. Thus, the number of active days between the second and third scheduled service sessions for the first vehicle 104a is 73 days and the deviation in the count of active days between two consecutive scheduled service sessions for the first vehicle 104a is 58 active days. In a non-limiting example, a high deviation in a count of active days between consecutive scheduled service sessions for a vehicle may result in a higher service time (and, thereby, a higher service completion time) for the vehicle due to irregular wear and tear of vehicular systems or components in the vehicle. In some embodiments, the high deviation in a count of active days between consecutive scheduled service sessions for the vehicle may be indicative of prolonged periods of inactivity of the vehicle, causing various vehicular systems or components (e.g., a battery, an alternator, or the like) to malfunction and, thereby, resulting in a higher service time for the vehicle.

In an embodiment, the first plurality of features 214a determined by the machine learning engine 208 may include a mean time between failures (MTBF) for a vehicle between consecutive scheduled service sessions of the vehicle. In such an embodiment, the first plurality of feature values 216a may include the MTBF for each of the plurality of vehicles 104 between consecutive scheduled service sessions of a corresponding vehicle. The mean time between consecutive failures of a vehicle may refer to an average time between two subsequent failures of the vehicle. A low value of the mean time between consecutive failures of a vehicle indicates that the vehicle is prone to frequent failures and needs frequent repair and service to fix the causes of failures. A high value of the mean time between consecutive failures of a vehicle indicates that the vehicle does not suffer from frequent failures, and therefore, does not need frequent repair and service. In a non-limiting example, a vehicle (e.g., the first vehicle 104a) may have had scheduled service sessions at odometer readings of "5,000" km and "15,000" km respectively. Further, the vehicle may have had unscheduled service sessions at odometer readings of "7,000" km, "9,000" km, and "13,000" km respectively. Therefore, the vehicle has had three unscheduled sessions between consecutive scheduled service sessions. In such a scenario, an MTBF for the vehicle between the consecutive scheduled service sessions of the vehicle equals "2,000" km (i.e., (9,000−7,000+13,000−9,000)/3). A low MTBF for a vehicle between consecutive scheduled service sessions of the vehicle may indicate that that the vehicle is maintained or driven poorly. In a non-limiting example, a vehicle with a low MTBF between consecutive scheduled service sessions may be assigned a low priority level, increasing a wait time of the vehicle when the vehicle arrives at a service center (e.g., the first service center 102a) for servicing. Similarly, a vehicle with a high MTBF between consecutive scheduled service sessions may be assigned a high priority level, decreasing a wait time of the vehicle when the vehicle arrives at a service center (e.g., the first service center 102a) for servicing In an embodiment, the first plurality of features 214a determined by the machine learning engine 208 may include a driver score of a vehicle. In such an embodiment, the first plurality of feature values 216a may include the driver score of each of the plurality of vehicles 104. A driver score of a vehicle (e.g., the first vehicle 104a) is expressed as a score out of, for example, 100 and is indicative of a driver behavior of a driver of the vehicle. A higher driver score corresponds to better driving behavior. Good driving behavior may be characterized by use of defensive driving techniques, linear or non-aggressive acceleration, linear or non-aggressive braking, or the like. A bad driver score may indicate that the vehicle may have been driven poorly or aggressively by the driver. A vehicle with a high driver score may be assigned a higher priority level, that may decrease a waiting time of the vehicle at a service center (e.g., the first service center 102a) when the vehicle arrives at the service center for servicing. Similarly, a vehicle with a low driver score may be assigned a lower priority level, that may increase a waiting time of the vehicle at a service center (e.g., the first service center 102a) when the vehicle arrives at the service center for servicing.

It will be apparent to those of skill in the art that the first plurality of features 214a listed above are merely exemplary. The first plurality of features 214a may include any number of features or factors that affect a service completion time (i.e., service time or waiting time) of a vehicle without deviating from the scope of the disclosure. For example, the first plurality of features 214a may further include, but is not limited to, a deviation in running cost per unit distance between consecutive service (scheduled or unscheduled) sessions of a vehicle, an average daily distance covered by a vehicle over a time interval, or the like. Each feature of the first plurality of features 214a may have a positive or a negative correlation with service completion time (i.e., service time or waiting time).

In an embodiment, the second plurality of features 214b determined by the machine learning engine 208 may include a maximum time duration, a minimum time duration, and a median duration for vehicle servicing at the service center. In such an embodiment, the second plurality of feature values 216b may include the maximum time duration, the minimum time duration, and the median duration for vehicle servicing at each of the plurality of service centers 102. The maximum, minimum, and median time durations for vehicle servicing refer to time durations taken by a service center for performing a vehicle service on a vehicle. The maximum, minimum, and median time durations for vehicle servicing may be uniquely specified for each vehicle make/model and each type of service session (as shown in FIG. 6). In a non-limiting example, for a given vehicle model and type of service (e.g., first scheduled service session at "8,000" km), a service center with a lower overall maximum, minimum, and median time durations for vehicle servicing may be expected have a lower service completion time.

In an embodiment, the second plurality of features 214b determined by the machine learning engine 208 may include a maximum time duration, a minimum time duration, and a median duration for servicing/repairing each vehicular system or component (e.g., braking system, air conditioning system, a powertrain, or the like) in a vehicle. In such an embodiment, the second plurality of feature values 216b may include the maximum time duration, the minimum time duration, and the median duration for servicing/repairing each vehicular system or component at each of the plurality of service centers 102. The maximum, minimum, and median time durations for servicing/repairing a vehicular system or component refer to time durations taken by a service center for servicing/repairing a corresponding vehicular system or component in a vehicle. The maximum, minimum, and median time durations for servicing/repairing a vehicular system or component may be uniquely specified for each vehicle make/model and each type of service session.

In an embodiment, the second plurality of features 214b determined by the machine learning engine 208 may further include an availability (i.e., work schedule and holiday schedule) of operators at a service center. In such an embodiment, the second plurality of feature values 216b may include the availability (i.e., work schedule and holiday schedule) of each of the first and second set of operators 116 and 118 at the first and second service centers 102a and 102b, respectively. The availability of an operator refers to whether the operator is available at a given time, at a corresponding service center, for servicing vehicles. The availability of the operator at the corresponding service center affects a throughput (i.e., a number of vehicles serviced in a given time interval) of the service center. For example, absence of one or more operators, of the first set of operators 116a, at the first service center 102a may negatively impact a service completion time (i.e., increase a service time and/or a waiting time) of any vehicle (e.g., the first vehicle 104a) that arrives at the first service center 102a for servicing.

In an embodiment, the second plurality of features 214b determined by the machine learning engine 208 may further include a set of festivities corresponding a service center. In such an embodiment, the second plurality of feature values 216b may include the set of festivities corresponding to each of the first and second service centers 102a and 102b, respectively. A festival (e.g., Christmas, Thanksgiving, or the like), in a geographical location of a service center, may affect (increase or decrease) a count of vehicles being taken to the service center for servicing. If the count of vehicles being taken to the service center for servicing increases, service completion times for vehicles at the service center may increase due to an increase in wait time. Similarly, if the count of vehicles being taken to the service center for servicing decreases, service completion times for vehicles at the service center may decrease due to a decrease in wait time.

In an embodiment, the second plurality of features 214b determined by the machine learning engine 208 may further include a season corresponding to a service center. In such an embodiment, the second plurality of feature values 216b may include the season corresponding to each of the first and second service centers 102a and 102b, respectively. A season (e.g., monsoon), in a geographical location of a service center, may affect (increase or decrease) a count of vehicles being taken to the service center for servicing. For example, more vehicles may visit a service center for repairing a corresponding suspension system before, after, or during a monsoon. If the count of vehicles being taken to the service center for servicing increases, service completion times for vehicles at the service center may increase due to an increase in wait time. Similarly, if the count of vehicles being taken to the service center for servicing decreases, service completion times for vehicles at the service center may decrease due to a decrease in wait time.

In an embodiment, the second plurality of features 214b determined by the machine learning engine 208 may further include a workmanship rating of each operator at a service center. In such an embodiment, the second plurality of feature values 216b may include the workmanship rating of each of the first and second set of operators 116 and 118 at the first and second service centers 102a and 102b, respectively. A workmanship rating of an operator refers to a skill level, a speed, an efficiency, and a quality of work of an operator. The workmanship rating of the operator may be different for different types of service (e.g., general servicing, painting, suspension tuning, engine overhaul, fault diagnosis, or the like). In a non-limiting example, the workmanship rating of the operator may be a function (e.g., an average) of workmanship ratings of the operator for the different types of service. Workmanship rating may be represented as a numeric, alphabetical, or an alphanumeric value. For example, the operator 116a, of the first set of operators 116, may have a workmanship rating of "4" on a scale of "5". A service center that has a higher overall workmanship rating of a corresponding set of operators may be expected to have a lower servicing completion time (i.e., lower service time) for vehicles that arrive at the service center for servicing.

In an embodiment, the second plurality of features 214b determined by the machine learning engine 208 may further include a capacity of each service center. In such an embodiment, the second plurality of feature values 216b may include the capacity of each of the first and second service centers 102a and 102b, respectively. As described in the foregoing description of FIG. 3, capacity of a service center refers to a number of vehicles that can be simultaneously serviced at the service center, given that there are no resource constraints (i.e., no shortage of operators). The capacity of the service center may be a function of a count of service bays in the service center and a count of vehicles that can be simultaneously accommodated by each service bay. In a non-limiting example, given two service centers, a service center that has a higher capacity may be expected to have a lower servicing completion time (i.e., lower service time) for vehicles that arrive at the service center for servicing, all other parameters between the two service centers being equal.

In an embodiment, the second plurality of features 214b determined by the machine learning engine may further include an assessment of a health status or condition of a vehicle by a driver and an operator. In such an embodiment, the second plurality of feature values 216b may include an assessment of a health status (i.e., a condition) of each of the plurality of vehicles 104 (and corresponding vehicular systems or components) by a corresponding driver, prior to a service session of a corresponding vehicle at any of the first and second service centers 102a and 102b. The second plurality of feature values 216b may further include an assessment of a health status (i.e., a condition) of each of the plurality of vehicles 104 (and corresponding vehicular systems or components) by a corresponding operator, before and after a service session of a corresponding vehicle at any of the first and second service centers 102a and 102b. As described in the foregoing, the NLP engine 203 may extract the set of textual elements from each of the set of diagnostic reports, and convert the set of textual elements, extracted from each diagnostic report, into the set of numerical values. In other words, the second plurality of feature values 216b includes the set of numerical values corresponding to each of the set of diagnostic reports. For example, if a health status (i.e., a condition) of the first vehicle 104a, as assessed by the driver of the first vehicle 104a, is better (i.e., lower count of faulty vehicular systems) than a health status of the second vehicle 104b, as assessed by the driver of the second vehicle 104b, the first vehicle 104a may be expected to have a lower service time than the second vehicle 104b. Similarly, if the health status (i.e., a condition) of the first vehicle 104a, as assessed by an operator at a service center, is better than a health status of the second vehicle 104b, as assessed by the operator, the first vehicle 104a may be expected to have a lower service time than the second vehicle 104b.

In an embodiment, the second plurality of features 214b determined by the machine learning engine 208 may further include a set of ground conditions at each service center. For the sake of brevity, the terms "ground conditions" and "prevailing ground conditions" are used interchangeably throughout the disclosure. In such an embodiment, the second plurality of feature values 216b may include the set of ground conditions at each of the first and second service centers 102a and 102b, respectively. Set of ground conditions at a service center refers to various quantifiable conditions, at the service center, that may affect service completion times (i.e., wait time and/or service time) of vehicles at the service center. The various quantifiable conditions may include, but are not limited to, a count of vehicles being serviced at the service center, a count of vacant slots in each service bay in the service center, a count of vehicles awaiting service at the service center, or the like. Each of the various quantifiable conditions may have a positive or a negative correlation with a service completion time (i.e., wait time or service time) of a vehicle (e.g., the first vehicle 104a) that arrives at the service center (e.g., the first service center 102a) for servicing.

It will be apparent to those of skill in the art that the second plurality of features 214b listed above are merely exemplary. The second plurality of features 214b may include any number of features or factors that affect a service completion time (i.e., service time or wait time) of a vehicle without deviating from the scope of the disclosure. Each feature of the second plurality of features 214b may have a positive or a negative correlation with service completion time (i.e., service time or waiting time).

In one embodiment, the machine learning engine 208 may be configured to train the prediction model 212 based on the first plurality of feature values 216a and the second plurality of feature values 216b. The machine learning engine 208 may input the first and second pluralities of features 214a and 214b and the first and second pluralities of feature values 216a and 216b to the prediction model 212 for training. Based on the first and second pluralities of features 214a and 214b and the first and second pluralities of feature values 216a and 216b, the prediction model 212 may learn a pattern or trend in the first and second pluralities of feature values 216a and 216b corresponding to the service completion times of the historical service sessions of the plurality of vehicles 104 at the plurality of service centers 102. In other words, during training, the prediction model 212 learns (or determines) feature values that affect service completion times (i.e., wait times and service times), based on the first and second pluralities of feature values 216a and 216b. The prediction model 212 further learns an extent to which each feature value affects the service completion times. Thus, after training, when new feature values of a vehicle corresponding to the first and second pluralities of features 214a and 214b are inputted to the prediction model 212, the trained prediction model 212 predicts or determines a service completion time for the vehicle. The use of the trained prediction model 212 for prediction of service completion time is explained in detail in conjunction with FIG. 2B.

Figure 2B:
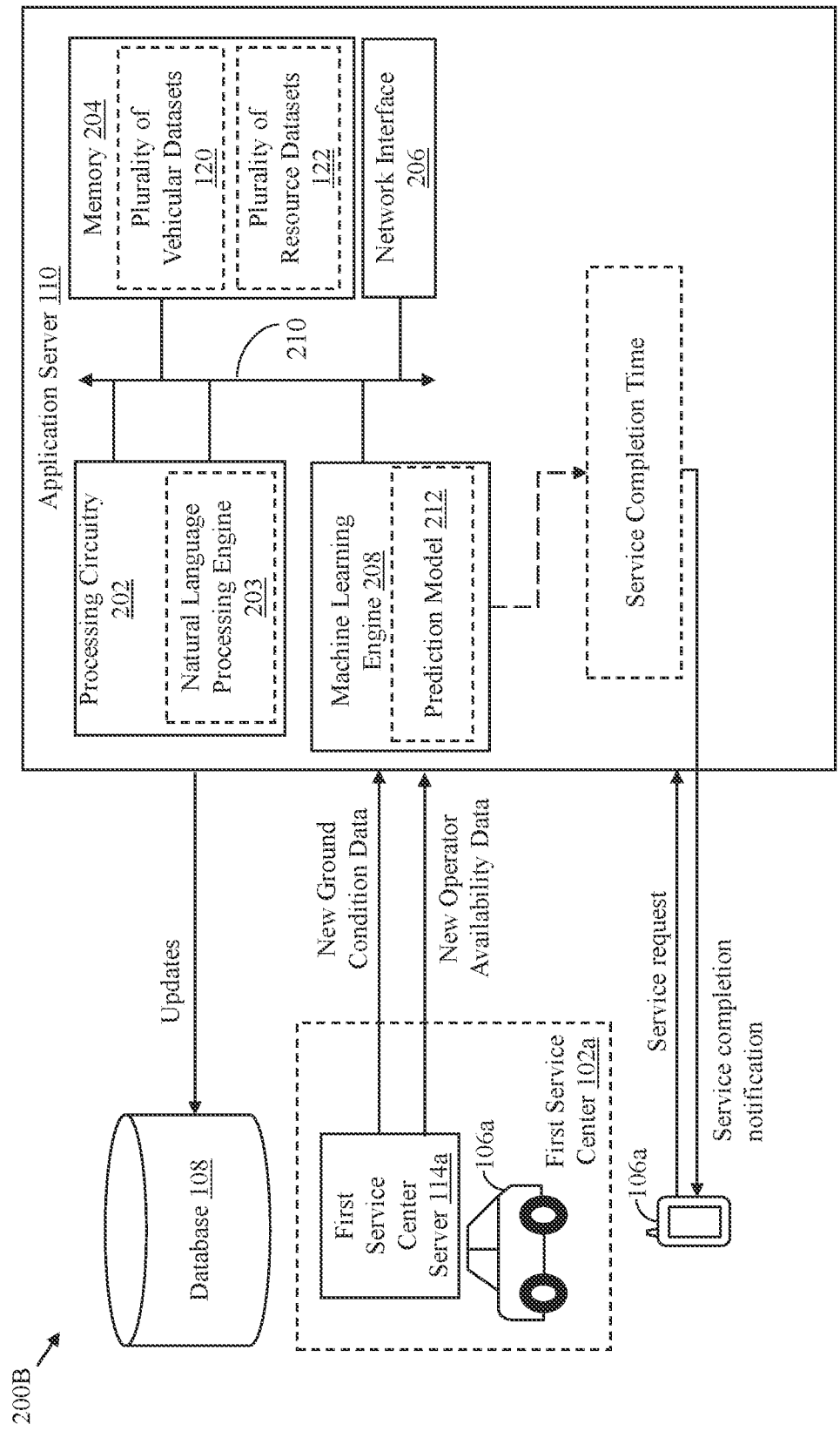
FIG. 2B is a schematic diagram that illustrates an exemplary scenario for predicting service completion times for servicing vehicles, in accordance with an exemplary embodiment of the disclosure.

FIG. 2B is a schematic diagram that illustrates an exemplary scenario 200B for predicting service completion times for servicing vehicles, in accordance with an exemplary embodiment of the disclosure. FIG. 2B is explained in conjunction with FIG. 2A. In FIG. 2B, it is assumed that the prediction model 212 is already trained to predict service completion times for vehicles.

Following a completion of the training phase of the application server 110, the application server 110 may receive a first service request from the first driver device 106a associated with the first vehicle 104a. The first service request is a request for scheduling a service session for the first vehicle 104a. In one embodiment, the first service request may be initiated by a driver of the first vehicle 104a, using the first driver device 106a. In one embodiment, the application server 110 may host a service application (e.g., a standalone application or a web-based application) that is configured to run on the plurality of driver devices 106. The service application that is being executed on each of the plurality of driver devices 106 may render an interactive user interface (UI) on a display of a corresponding driver device. The UI rendered on the display of the first driver device 106a may enable the driver of the first vehicle 104a to raise the first service request for servicing the first vehicle 104a. The rendered UI may enable the driver, of the first vehicle 104a, to specify a type of service (e.g., scheduled service, unscheduled service, repair of one or more vehicular systems or components, or the like) required. The UI may further enable the driver, of the first vehicle 104a, to specify one or more faults in the first vehicle 104a while initiating the first service request.

Examples of the one or more faults may include, but are not limited to, poor fuel economy, poor braking, hard clutch, poor efficacy of air conditioning system, or the like. However, for the sake of brevity, it is assumed that the first service request is initiated by way of the first driver device 106a for a scheduled service session (e.g., a scheduled service session at "48,000" km) of the first vehicle 104a. It is further assumed that the no faults are specified by the driver of the first vehicle 104a while initiating the service request on the first driver device 106a. The initiated service request may be communicated to the application server 110 by the first driver device 106a. The first service request may indicate the type of service (i.e., scheduled service session) required by the first vehicle 104a.

Following the reception of the first service request, the application server 110 may retrieve the first vehicular dataset (as shown in FIG. 3), corresponding to the first vehicle 104a, from the database 108. As described in the foregoing description of FIG. 3, the first vehicular dataset includes a current asset health index and a probability of failure of each vehicular system in the first vehicle 104a. The application server 110 may determine, based on the asset health index of the first vehicle 104a and the probability of failure of each vehicular system in the first vehicle 104a, a set of vehicular systems or components in the first vehicle 104a that require servicing. For example, if the probability of failure of a vehicular system (e.g., the braking system) in the first vehicle 104a is above a pre-determined threshold (e.g., "60%"), the application server 110 may determine that a correspond vehicular system requires servicing and/or repair. In the current embodiment, for the sake of brevity, it is assumed that the probability of failure of each vehicular system or component in the first vehicle 104a is below the pre-determined threshold. Therefore, all vehicular systems or components in the first vehicle 104a are deemed healthy and, thus, may not require service or repair.

The first vehicular dataset may include a first manufacturer-mandated procedure for servicing the first vehicle 104a during a scheduled service session. The first manufacturer-mandated procedure indicates that a plurality of operations are to be performed for servicing the first vehicle 104a. In a non-limiting example, the plurality of operations may include replacement of a set of brake pads in the first vehicle 104a, refilling of coolant in the first vehicle 104a, and replacement of engine oil in the first vehicle 104a. For the sake of brevity in the current disclosure, the plurality of operations include only three operations (i.e., the replacement of the set of brake pads, the refilling of coolant, and the replacement of engine oil). However, in an actual implementation, the plurality of operations may include many other operations (e.g., replacement of a set of air filters, replacement of a set of oil filters, replacement of transmission fluid, or the like) without deviating from the scope of the disclosure.

The application server 110 may determine, based on the plurality of operations, a set of spare components required for servicing the first vehicle 104a. The set of spare components may include a set of vehicular components or sub-components (e.g., brake pads, air or oil filters, sensors, or the like) required for servicing or repairing the first vehicle 104a. For the sake of brevity, it is assumed in the current embodiment that the set of spare components includes consumables (e.g., coolant, engine oil, or the like), in addition to physical spare parts. In a non-limiting example, the determined set of spare components includes a set of brake pads, "5" liters of engine oil, and "5" liters of coolant.

Further, the application server 110 may retrieve the plurality of resource datasets 122 from the database 108. The plurality of resource datasets 122 may be indicative of a plurality of service centers (e.g., the plurality of service centers 102) available for servicing the first vehicle 104a. The application server 110 may select, from the plurality of service centers 102, a set of service centers suitable for servicing the first vehicle 104a. The set of service centers may be selected based on various criteria that include, but not limited to, a proximity of each of the set of service centers to a current location or a "home location" of the first vehicle 104a, a current state (e.g., open or closed) of each of the set of service centers, or the like. The various criteria may further include a count of previous service sessions of the first vehicle 104a at each of the set of service centers, a set of ratings provided by the driver of the first vehicle 104a to each of the set of service centers based on one or more service sessions, or the like. For the sake of brevity, it is assumed that the set of service centers includes both the first and second service centers 102a and 102b.

In some embodiments, each of the first and second service centers 102a and 102b may be associated with an enterprise resource management (ERP) application. Function of the ERP application will be well known to those of skill in the art. In other words, each of the first and second service center servers 114a and 114b may execute the ERP application. The ERP application running on each of the first and second service center servers 114a and 114b may maintain a list of spare parts or components available at a corresponding service center (e.g., the first and second service centers 102a and 102b).

The application server 110 may communicate a service cost quotation request to each of the first and second service center servers 114a and 114b. The service cost quotation request may be a request for determining a cost for servicing the first vehicle 104a at each of the selected set of service centers (e.g., the plurality of service centers 102). The service cost quotation request may be indicative of the set of spare components and the plurality of operations that need to be performed on the first vehicle 104a for servicing the first vehicle 104a. Based on the reception of the service quotation request, the first and second service center servers 114a and 114b may query the ERP application to determine whether the set of spare components indicated by service quotation request is available at the first and second service centers 102a and 102b. For the sake of brevity, it is assumed that the ERP application being executed on the first and second service center servers 114a and 114b indicates that both the first and second service centers 102a and 102b have the set of spare components in stock. Further, the first service center server 114a may query the ERP application to determine a cost of each of the set of spare components. Based on the query, the first service center server 114a may determine a first spares cost for the set of spare components available at the first service center 102a. The second service center server 114b may query the ERP application to determine a cost of each of the set of spare components at the second service center 102b. Based on the query, the second service center server 114b may determine a second spares cost for the set of spare components available at the second service center 102b.

Similarly, the first and second service center servers 114a and 114b may determine, based on the plurality of operations, first and second labor costs for servicing the first vehicle 104a at the first and second service centers 102a and 102b, respectively. The first and second service center servers 114a and 114b may communicate, to the application server 110, first and second service quotation responses, respectively. The first service quotation response may indicate a first service cost (i.e., a sum of the first spares cost and the first labor cost) for servicing the first vehicle 104a at the first service center 102a. The first service cost may further indicate that the set of spare components are available (i.e., availability of the set of spare components) at the first service center 102a for servicing the first vehicle 104a. Similarly, the second service quotation response may indicate a second service cost (i.e., a sum of the second spares cost and the second labor cost) for servicing the first vehicle 104a at the second service center 102b. The second service cost may further indicate that the set of spare components are available (i.e., availability of the set of spare components) at the second service center 102b for servicing the first vehicle 104a.

The application server 110 may receive the first and second service quotation responses from the first and second service center servers 114a and 114b. Based on the first and second service quotation responses, the application server 110 may determine the first and second service costs for servicing the first vehicle 104a at the first and second service centers 102a and 102b, respectively. The application server 110 may further determine the availability of the set of spare components at the first and second service centers 102a and 102b, based on the first and second service quotation responses.

Since both the first and second service centers 102a and 102b have the set of spare components in stock, the application server 110 may compare the first and second servicing costs. In a non-limiting example, it is assumed that the first servicing cost is less than the second servicing cost. Therefore, the application server 110 may allocate the first vehicle 104a to the first service center 102a for servicing. For the sake of brevity, it is assumed that the allocation of the first vehicle 104a to the first service center 102a, based on the comparison of the first and second servicing costs (i.e., service cost was a factor in the allocation). However, it will be apparent to those of skill in the art that the allocation may be based on other factors such as proximity of each of the first and second service centers 102a and 102b to a current location of the first vehicle 104a, difference between ratings of the first and second service centers 102a and 102b, or the like. The application server 110 may use a combination of aforementioned factors for allocating vehicles to service centers for servicing.

Based on the allocation, the application server 110 may communicate an allocation notification to the first driver device 106a, indicating the allocation of the first vehicle 104a to the first service center 102a. Based on the allocation notification, the service application being executed on the first driver device 106a may present, on the display of the first driver device 106a, a message indicating the first service cost and the allocation of the first vehicle 104a to the first service center 102a. Based on the presented message, the first vehicle 104a may be taken or driven to the first service center 102a by the corresponding driver for servicing.

In another embodiment, the application server 110 may communicate, to the first driver device 106a, a service center selection request, requesting the driver of the first vehicle 104a to select a service center from the first and second service centers 102a and 102b for servicing the first vehicle 104a. Based on the service center selection request, the service application may present, on the display of the first driver device 106a, a message indicating the availability of the set of spare components at each service center (e.g., the first and second service centers 102a and 102b) and the first and second service costs for servicing the first vehicle 104a at each service center. The service application may prompt the driver to select one of the first and second service centers 102a and 102b for servicing the first vehicle 104a. Based on a selection by the driver, the application server 110 may allocate the first vehicle 104a to one of the first and second service centers 102a and 102b for servicing.

In another embodiment, no service request may be communicated by the driver of the first vehicle 104a to the application server 110 for the servicing of the first vehicle 104a. In other words, the first vehicle 104a may arrive at (i.e., may be driven to) a service center (e.g., the first service center 102a) without any prior intimation or allocation of the first vehicle 104a to the service center. However, for the sake of brevity it is assumed the first vehicle 104a is taken or driven to the first service center 102a for servicing, based on the allocation of the first vehicle 104a to the first service center 102a.

The first service center server 114a may receive the identification information of the first vehicle 104a when the first vehicle 104a arrives at the first service center 102a. The identification information may be received by the first service center server 114a using various methods and techniques.

In one embodiment, the vehicle registration number or the VIN (i.e., the identification information), of the first vehicle 104a, is manually entered by an operator (e.g., any of the first set of operators 116), at the first service center 102a, into a corresponding operator device (not shown). The corresponding operator device may communicate the identification information of the first vehicle 104a to the first service center server 114a.

In another embodiment, the first service center 102a may include, therein, a computing system (not shown) that employs machine vision (i.e., image recognition) to identify vehicles (e.g., the first vehicle 104a) that arrive at the first service center 102a for servicing. The computing system may include one or more cameras configured to capture an image of a vehicle registration plate of the first vehicle 104a that arrives at the first service center 102a for servicing. The computing system may process the image of the vehicle registration plate of the first vehicle 104a to obtain a vehicle registration number of the first vehicle 104a. The vehicle registration number of the first vehicle 104a may then be communicated, by the computing system, to the first service center server 114a.

In another embodiment, self-service kiosks may be installed at the first service center 102a. Such self-service kiosks may allow a vehicle registration number or a VIN (i.e., the identification information) of the first vehicle 104a to be entered, into the self-service kiosks, by the driver of the first vehicle 104a or operators (e.g., the first set of operators 116). The kiosks may communicate the entered identification information to the first service center server 114a.

Based on the received identification information of the first vehicle 104a, the first service center server 114a may communicate a vehicle arrival notification to the application server 110. The vehicle arrival notification may indicate the arrival of the first vehicle 104a at the first service center 102a. The first service center server 114a may further communicate, to the application server 110, new ground condition data and new operator availability data. The new ground condition data may be indicative of a set of prevailing ground conditions at the first service center 102a. The set of prevailing grounding conditions may include, but is not limited to, a count of vehicles that are awaiting servicing at the first service center 102a, a count of vehicles currently being serviced at the first service center 102a, a level of occupancy of service bays in the first service center 102a, or the like. The application server 110 may identify the set of prevailing conditions at the first service center 102a, based on the new ground condition data. The new operator availability data may indicate a count of operators, of the first set of operators 116, that are currently available at the first service center 102a for servicing the vehicles. The new operator availability data may further indicate an operator identifier of each operator currently available or present at the first service center 102a.

Based on the received new operator availability data and the new ground condition data, the application server 110 may update the first resource dataset. For example, the application server 110 may update the first resource dataset to indicate the count of operators, of the first set of operators 116, that are currently present at the first service center 102a.

For predicting the service completion time for servicing the first vehicle 104a at the first service center 102a, the application server 110 may provide as input, to the prediction model 212, the first vehicular dataset, the updated first resource dataset, and/or the plurality of operations. In other words, the application server 110 may determine, based on the first vehicular dataset, the updated first resource dataset, and/or the plurality of operations, new feature values corresponding to the first and second pluralities of feature values 216a and 216b.

In some embodiments, the application server 110 may receive voice data or text data, from the driver of the first vehicle 104a. The voice data or the text data may indicate an assessment of a current health status of the first vehicle 104a by the driver of the first vehicle 104a. The voice data or the text data may be received from the driver of the first vehicle 104a as part of the service request. Alternatively, the voice data or the text data may be received from the first service center server 114a following the arrival of the first vehicle 104a at the first service center 102a. The NLP engine 203, in the application server 110, may extract from the text data or a transcript of the voice data, a set of textual elements, analyze the set of textual elements, and convert the analyzed set of textual elements into a set of new numerical values representative of the assessment of the current health status of the first vehicle 104a by the driver of the first vehicle 104a. In such a scenario, the application server 110 may further determine the new feature values based on the set of new numerical values.

The application server 110 may provide the new feature values as input to the prediction model 212 for predicting the service completion time for servicing the first vehicle 104a. The first vehicular dataset may be same as that described in FIG. 3 or may have been updated during an interim time period between a training of the prediction model 212 and the arrival of the first vehicle 104a at the first service center 102a for servicing. In some embodiments, the application server 110 may further provide as input, to the trained prediction model 212, a priority level of the first vehicle 104a at the first service center 102a. A priority level of a vehicle refers to a position of the vehicle among a queue of vehicles awaiting servicing at a service center. For example, the priority level of the first vehicle 104a may define a "queue position" of the first vehicle 104a among other vehicles awaiting servicing at the first service center 102a. A higher priority level may correspond to a higher queue position, which results in a lower wait time. Similarly, a lower priority level may correspond to a lower queue position, which results in a higher wait time.

In one embodiment, the application server 110 may determine the priority level of the first vehicle 104a (i.e., assign the first vehicle 104a the priority level). In another embodiment, the first service center server 114a may determine the priority level of the first vehicle 104a (i.e., assign the first vehicle 104a the priority level). The assignment of the priority level to the first vehicle 104a may be based on the first vehicular dataset and vehicular datasets of other vehicles awaiting service at the first service center 102a. The vehicular datasets of the other vehicles may be retrieved from the database 108, based on identification information of the other vehicles. As described in the foregoing description of FIG. 2A, various features of the first plurality of features 214a may affect the priority level of the first vehicle 104a. In a non-limiting example, the first vehicle 104a may be assigned a higher priority level if a count of accidents, after a previous unscheduled service, of the first vehicle 104a is less than a count of accidents, after a previous unscheduled service, of each of the other vehicles awaiting service at the first service center 102a. In other words, each vehicle awaiting service at the first service center 102a may be assigned a priority level which defines a relative queue position of a corresponding vehicle.

In some embodiments, no other vehicles may be awaiting servicing at the first service center 102a when the first vehicle 104a arrives at the first service center 102a. In such an embodiment, no priority level (i.e., no queue position) may be assigned to the first vehicle 104a.

Based on the inputted first vehicular dataset, the updated first resource dataset, the plurality of operations, and/or the priority level assigned to the first vehicle 104a, the trained prediction model 212 predicts the service completion time (i.e., the wait time and service time) for the first vehicle 104a. In other words, the prediction model 212 may predict the wait time and the service time for the first vehicle 104a. The wait time for the first vehicle 104a refers to a time duration or time period between a first time-instance of the arrival of the first vehicle 104a at the first service center 102a and a second time-instance at which the first set of operators 116 is expected to commence the servicing of the first vehicle 104a. The service time for the first vehicle 104a refers to a time duration or time period between the second time-instance and a third time-instance at which the first set of operators 116 is expected to complete the servicing of the first vehicle 104a. For example, if the first through second time-instances correspond to "01:00" pm and "03:00" pm, the wait time for the first vehicle 104a is "2" hours. If the predicted service time equals "2" hours, it is expected that the servicing of the first vehicle 104a will be complete by "05:00" pm (i.e., the service completion time). Therefore, the service completion time or duration equals "4" hours (i.e., wait time+service time). The application server 110 may communicate the predicted service completion time (i.e., the predicted wait time and the predicted service time) to the first driver device 106a and the first service center server 114a.

The application server 110 may further determine, based on the determined plurality of operations, the service completion time, and the set of prevailing ground conditions, a sequence in which the plurality of operations are to be performed on the first vehicle 104a for complying with the predicted service completion time. In a non-limiting example, the plurality of operations includes first through third operations, namely, replacement of the set of brake pads, the refilling of the coolant, and the replacement of the engine oil, respectively. The determined sequence defines an order in which the first through third operations are to be performed, on the first vehicle 104a, for complying with the predicted service completion time. The sequence for performing the plurality of operations may be determined a manner that avoids any disturbance in a servicing of other vehicles being serviced at the first service center 102a or overloading of any service bay of the first vehicle 104a. In a non-limiting example, the determined sequence may indicate that the first through third operations are to be performed in this order (i.e., the first operation followed by second operation, followed by the third operation).

In some embodiments, the predicted service completion time may not be acceptable to the driver of the first vehicle 104a, when the priority level of the first vehicle 104a is very low or if the first vehicle 104a arrives when the first service center 102a is about to close for the day. For example, if the first vehicle 104a arrives at the first service at "6:30" pm (i.e., arrives when the first service center 102a is about to close at "07:00" pm), the predicted wait time for the first vehicle 104a may be equal to "15.5" hours ("6:30" pm to "10:00" am of next day). In such a scenario, the service completion time of the first vehicle 104a may be very high even if the service time is low, owing to the high wait time. If the predicted service completion time is deemed unacceptable by the driver of the first vehicle 104a, the first vehicle 104a may be taken by the driver, of the first vehicle 104a, to another service center (e.g., the second service center 102b that operates at night time).

In a non-limiting example, the predicted service completion time is acceptable to the driver of the first vehicle 104a, and, therefore, the plurality of operations are performed on the first vehicle 104a by the first set of operators 116 in the sequence determined by the application server 110. Upon completion of the servicing of the first vehicle 104a, the first service center server 114a may communicate a service completion notification, indicating the completion of the servicing of the first vehicle 104a, to the application server 110. The service completion notification may be indicative of a time-instance at which the servicing of the first vehicle 104a was completed. The application server 110 may compare the time-instance indicated by the service completion notification to the predicted service completion time (e.g., the third time-instance). If an actual service completion time (as referenced by the time-instance indicated in the service completion notification) exceeds the predicted service completion time, the application server 110 may communicate a request to the first service center server 114a to determine a cause for delay in the completion of the servicing of the first vehicle 104a. In a non-limiting example, if the application server 110 determines the cause for the delay to be legitimate, the application server 110 may use the determined cause for the delay as feedback for the prediction model 212 and re-train the prediction model 212 based on the feedback.

If the actual service completion time is less than or equal to the predicted service completion time, the application server 110 may use the actual service completion time as feedback for the prediction model 212 and re-train the prediction model 212 based on the feedback. In other words, the actual service completion time is used, by the application server 110, as feedback for re-training the prediction model 212. In the re-training of the prediction model 212, the weights of one or more features of the first and second pluralities of features 214a and 214b to capture an accurate correlation between a corresponding feature and service completion time.

Further, the application server 110 may communicate the service completion notification to the first driver device 106a, requesting the driver of the first vehicle 104a to pick up the first vehicle 104a from the first service center 102a. Further, the application server 110 may communicate a set of updates to the database 108. In a non-limiting example, the set of updates may include a set of new diagnostic reports corresponding to the servicing of the first vehicle 104a, new data regarding probabilities of failure of the vehicular systems in the first vehicle 104a, or the like. The database 108 may update the first vehicular dataset and/or the first resource dataset, based on the set of updates.

In some embodiments, the application server 110 may communicate, to the first and second service center servers 114a and 114b, a localized version of the trained prediction model 212 that is executable on the first and second service center servers 114a and 114b. In such scenarios, various functions (e.g., the prediction of the service completion time, the determination of the sequence for performing the plurality of operations, or the like) of the application server 110 may be performed locally by the first service center server 114a (or the second service center server 114b).

Figure 7:
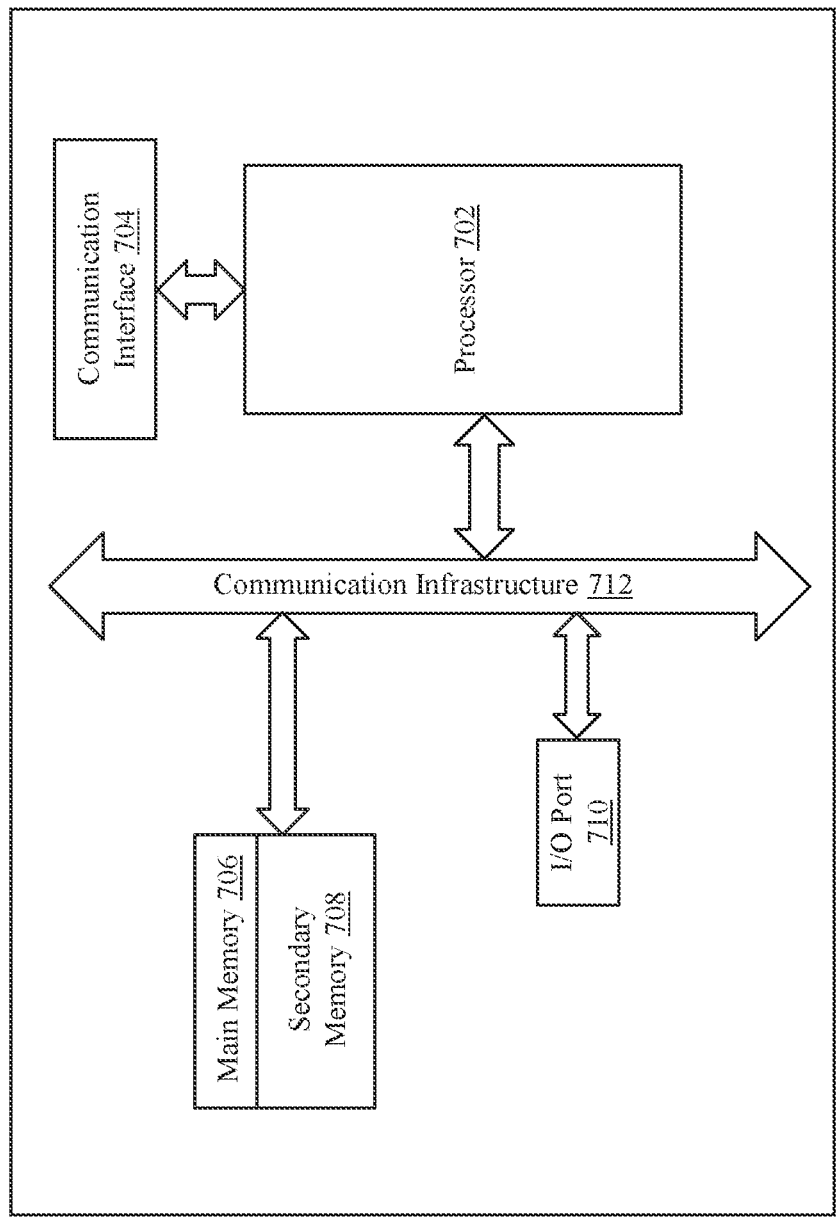
FIG. 7 is a block diagram that illustrates a system architecture of a computer system for facilitating vehicle servicing, in accordance with an exemplary embodiment of the disclosure.

FIG. 7 is a block diagram that illustrates a system architecture of a computer system 700 for facilitating vehicle servicing, in accordance with an exemplary embodiment of the disclosure. An embodiment of the disclosure, or portions thereof, may be implemented as computer readable code on the computer system 700. In one example, the database 108, the application server 110, and the first and second service center servers 114a and 114b may be implemented in the computer system 700 using hardware, software, firmware, non-transitory computer readable media having instructions stored thereon, or a combination thereof and may be implemented in one or more computer systems or other processing systems. Hardware, software, or any combination thereof may embody modules and components used to implement the methods of FIGS. 8A-8C, 9A-9B, and 10.

The computer system 700 may include a processor 702 that may be a special purpose or a general-purpose processing device. The processor 702 may be a single processor or multiple processors. The processor 702 may have one or more processor "cores." Further, the processor 702 may be coupled to a communication interface 704, such as a bus, a bridge, a message queue, the communication network 112, multi-core message-passing scheme, or the like. The computer system 700 may further include a main memory 706 and a secondary memory 708. Examples of the main memory 706 may include RAM, ROM, and the like. The secondary memory 708 may include a hard disk drive or a removable storage drive (not shown), such as a floppy disk drive, a magnetic tape drive, a compact disc, an optical disk drive, a flash memory, or the like. Further, the removable storage drive may read from and/or write to a removable storage device in a manner known in the art. In an embodiment, the removable storage unit may be a non-transitory computer readable recording media.

The computer system 700 may further include an input/output (I/O) port 710 and a communication infrastructure 712. The I/O port 710 may include various input and output devices that are configured to communicate with the processor 702. Examples of the input devices may include a keyboard, a mouse, a joystick, a touchscreen, a microphone, and the like. Examples of the output devices may include a display screen, a speaker, headphones, and the like. The communication infrastructure 712 may be configured to allow data to be transferred between the computer system 700 and various devices that are communicatively coupled to the computer system 700. Examples of the communication infrastructure 712 may include a modem, a network interface, i.e., an Ethernet card, a communication port, and the like. Data transferred via the communication infrastructure 712 may be signals, such as electronic, electromagnetic, optical, or other signals as will be apparent to a person skilled in the art. The signals may travel via a communications channel, such as the communication network 112, which may be configured to transmit the signals to the various devices that are communicatively coupled to the computer system 700. Examples of the communication channel may include a wired, wireless, and/or optical medium such as cable, fiber optics, a phone line, a cellular phone link, a radio frequency link, and the like. The main memory 706 and the secondary memory 708 may refer to non-transitory computer readable mediums that may provide data that enables the computer system 700 to implement the methods illustrated in FIGS. 8A-8C, 9A-9B, and 10.

Figure 8C:
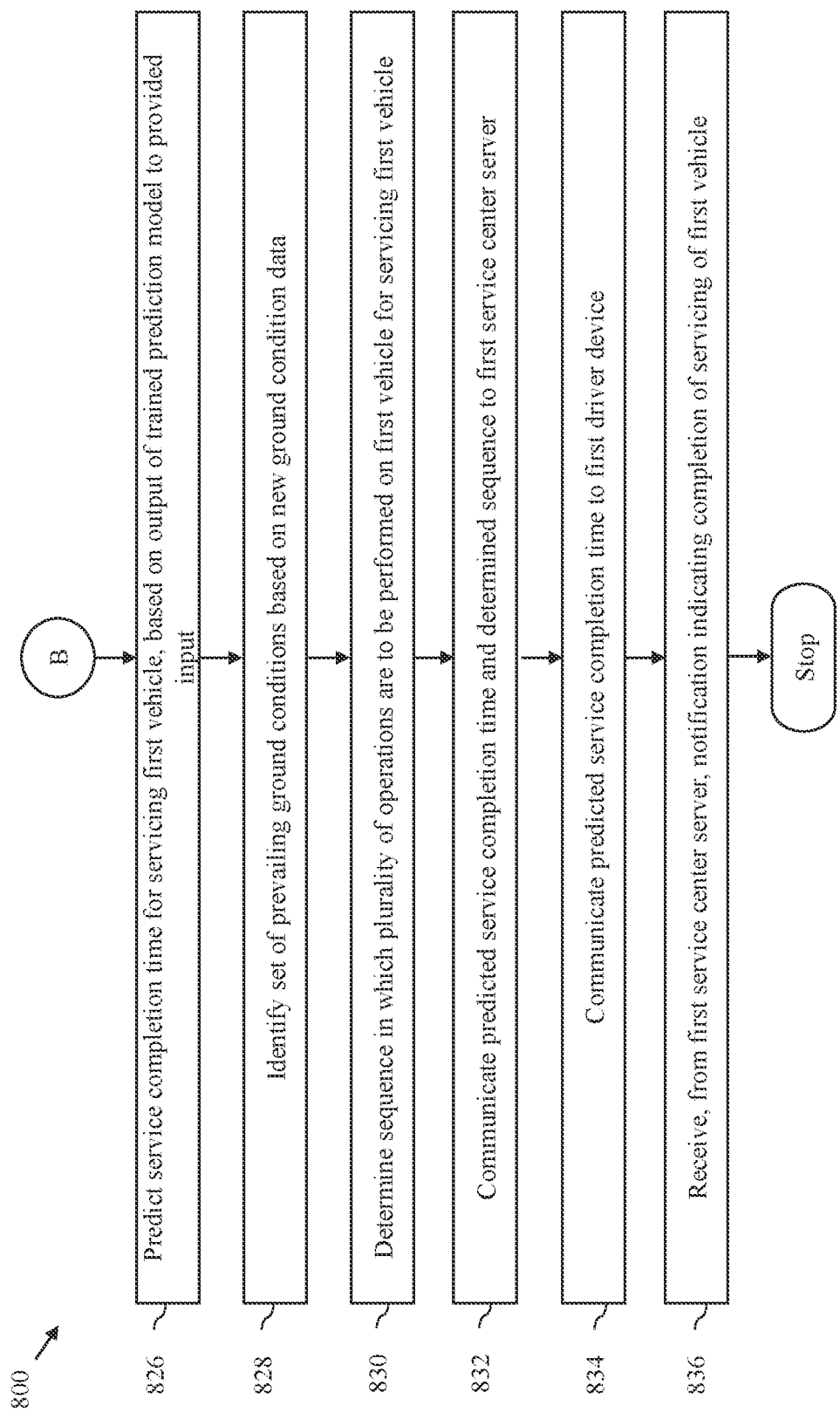

FIGS. 8A-8C collectively, represent a flow chart 800 that illustrates a method for facilitating servicing of vehicles at service centers, in accordance with an exemplary embodiment of the present disclosure.

Referring to FIG. 8A, at 802, the plurality of vehicular datasets 120 for the plurality of vehicles 104 are retrieved from the database 108. The application server 110 retrieves, from the database 108, the plurality of vehicular datasets 120 for the plurality of vehicles 104. At 804, the plurality of resource datasets 122 for the plurality of service centers 102 are retrieved from the database 108. the application server 110 retrieves, from the database 108, the plurality of resource datasets 122 for the plurality of service centers 102. The plurality of resource datasets 122 includes the first and second service center information, the operator profiles of the first and second sets of operators 116 and 118, and the set of diagnostic reports corresponding to service sessions performed by the first and second service centers 102a and 102b in the past. At 806, the set of diagnostic reports is analyzed by using the set of NLP techniques. The application server 110 analyzes, using the set of NLP techniques, the set of diagnostic reports corresponding to the service sessions performed by the first and second service centers 102a and 102b in the past. At 808, the portion of the service history of each service center, of the first and second service centers 102a and 102b, is determined based on the analysis of the set of diagnosis reports. The application server 110 determines the portions of the first and second resource datasets 122 (i.e., the service history of the first and second service centers 102a and 102b) of the first and second service centers 102a and 102b, based on the analysis of the set of diagnostic reports using the set of NLP techniques. At 810, the first plurality of features 214a are determined based on the plurality of vehicular datasets 120. The application server 110 determines the first plurality of features 214a based on the plurality of vehicular datasets 120, using the feature selection and/or the feature engineering techniques. The first plurality of features 214a have a high degree of correlation with service completion times for vehicles. The application server 110 further determines the weight for each of the first plurality of features 214a, based on a degree of correlation between a corresponding feature and service completion times for vehicles. At 812, the second plurality of features 214b are determined based on the plurality of resource datasets 122. The application server 110 determines, using the feature selection and/or the feature engineering techniques, the second plurality of features 214b, based on the plurality of resource datasets 122. The second plurality of features 214b have a high degree of correlation with service completion times for vehicles. The application server 110 further determines the weight for each of the second plurality of features 214b, based on a degree of correlation between a corresponding feature and service completion times for vehicles. The second plurality of features 216b includes a maximum, minimum, and median time duration for servicing vehicles (of various makes and models) at a service center. The second plurality of features 216b further includes a work schedule, a holiday schedule, and a level of workmanship of each operator in a service center.

Referring to FIG. 8B, at 814, the first plurality of feature values 216a are determined for the first plurality of features 214a. The application server 110 determines, for each vehicle of the plurality of vehicles 104, the first plurality of feature values 216a based on a corresponding vehicular dataset of the plurality of vehicular datasets 120. In other words, the application server 110 determines the first plurality of feature values 216a for each of the first through fifth vehicles 104a-104e, based on the corresponding first through fifth vehicular datasets, respectively. At 816, the second plurality of feature values 216b are determined for the second plurality of features 214b. The application server 110 determines, for each service center of the plurality of service centers 102, the second plurality of feature values 216b based on a corresponding resource dataset of the plurality of resource datasets 122. In other words, the application server 110 determines the second plurality of feature values 216b for each of the first and second service centers 102a and 102b, based on the corresponding first and second resource datasets, respectively. The first and second resource datasets 122 include the service histories of the first and second service centers 102a and 102b, respectively. At 818, the prediction model 212 is trained, based on the first and second plurality of values 216a and 216b, to predict service completion times for one or more vehicles. The application server 110 trains the prediction model 212 to predict service completion times for servicing one or more vehicles, as described in the foregoing description of FIGS. 1 and 2A. At 820, the vehicle arrival notification indicating the arrival of the first vehicle 104a at the first service center 102a is received. The application server 110 receives, from the first service center server 114a, the vehicle arrival notification that indicates the arrival of the first vehicle 104a at the first service center 102a. At 822, the new ground condition data and the new operator availability data is received from the first service center server 114a. The application server 110 receives, from the first service center server 114a, the new ground condition data and the new operator availability data (as described in the foregoing description FIG. 2B). At 824, the first vehicular dataset, the first resource dataset, the new ground condition data, and the new operator availability data are provided as input to the trained prediction model 212. The application server 110 provides, as input to the trained prediction model 212, the first vehicular dataset, the first resource dataset, the new ground condition data, and the new operator availability data. Based on the provided input, the trained prediction model 212 generates, as output, the service completion time for servicing the first vehicle 104a at the first service center 102a.

Referring to FIG. 8C, at 826, the service completion time for servicing the first vehicle 104a is predicted based on the output of the trained prediction model 212 to the provided input. the application server 110 predicts (i.e., determines) the service completion time for servicing the first vehicle 104a at the first service center 102a, based on the output of the trained prediction model 212 to the provided input. At 828, the set of prevailing ground conditions at the first service center 102a is identified based on the new ground condition data. The application server 110 identifies the set of prevailing ground conditions at the first service center 102a based on the new ground condition data (as described in the foregoing description of FIG. 2B). At 830, the sequence in which the plurality of operations are to be performed on the first vehicle 104a is determined. The application server 110 determines, based on the identified set of prevailing ground conditions, the sequence in which plurality of operations are to be performed on the first vehicle 104a for complying with the predicted service completion time. At 832, the predicted service completion time and the determined sequence are communicated to the first service center server 114a. The application server 110 communicates the predicted service completion time and the determined sequence to the first service center server 114a. At 834, the predicted service completion time is communicated to the first driver device 106a. The application server 110 communicates the predicted service completion time to the first driver device 106a. To complete the servicing of the first vehicle 104a within the predicted service completion time, the plurality of operations are performed on the first vehicle 104a, in the determined sequence, by the first set of operators 116. Based on the completion of the servicing of the, the first service center server 114a communicates the service completion notification to the application server 110, indicating the completion of the servicing of the first vehicle 104a. At 836, the service completion notification, indicating the completion of the servicing of the first vehicle 104a, is received. The application server 110 receives the service completion notification from the first service center server 114a. The first vehicle 104a may be picked up by the driver, of the first vehicle 104a, from the first service center server 114a.

Figure 9A:
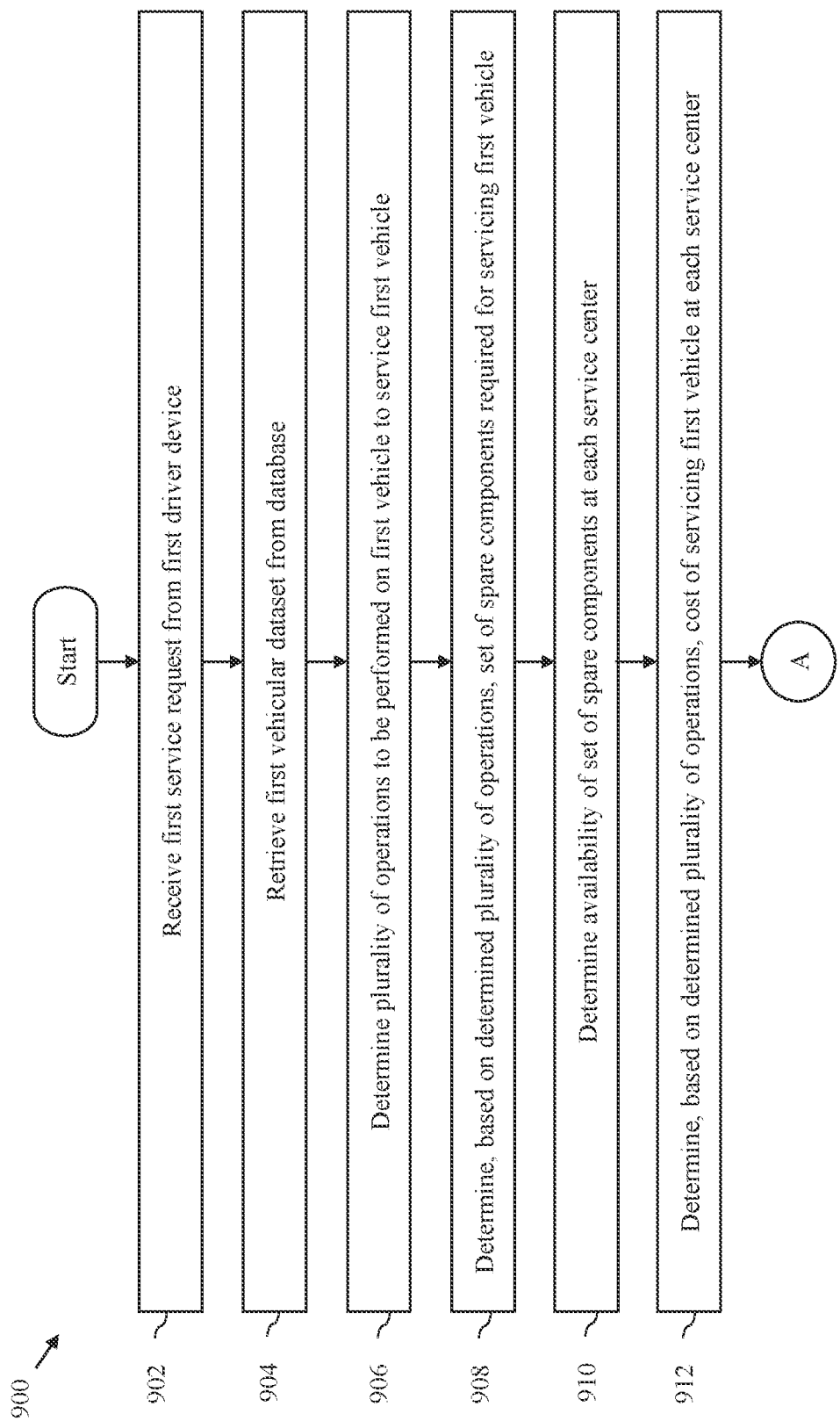
FIGS. 9A and 9B collectively, represent a flow chart that illustrates allocation of a vehicle to a service center for servicing, in accordance with an exemplary embodiment of the present disclosure.
Figure 9B:
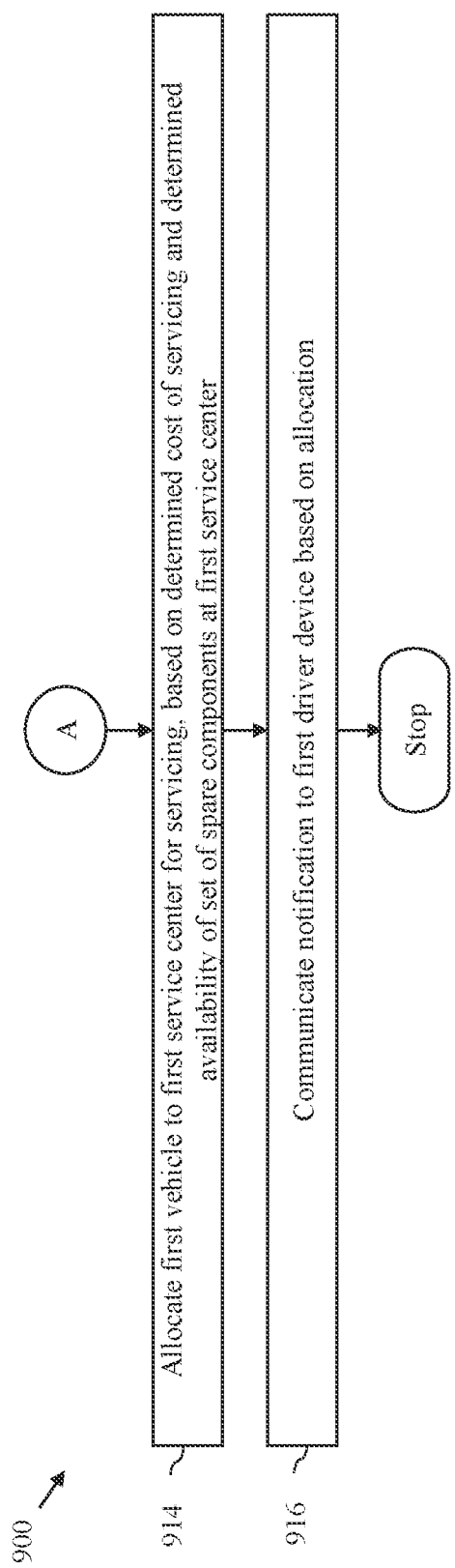

FIGS. 9A and 9B collectively, represent a flow chart 900 that illustrates the allocation of a vehicle to a service center for servicing, in accordance with an exemplary embodiment of the present disclosure.

Referring to FIG. 9A, at 902, the first service request is received from the first driver device 106a. The application server 110 receives, from the first driver device 106a, the first service request for servicing the first vehicle 104a. The first service request includes the identification information of the first vehicle 104a. At 904, the first vehicular dataset is retrieved from the database 108. Based on the identification information included in the first request, the application server 110 retrieves the first vehicular dataset from the database 108. The application server 110 analyzes the first vehicular dataset. At 906, the plurality of operations to be performed on the first vehicle 104a, to service the first vehicle 104a, are determined. The application server 110 determines, based on the analysis of the first vehicular dataset, the plurality of operations to be performed on the first vehicle 104a for servicing the first vehicle 104a. At 908, based on the determined plurality of operations, the set of spare components required for servicing the first vehicle 104a is determined. The application server 110 determines, based on the determined plurality of operations, the set of spare components (e.g., the set of brake pads) required for servicing the first vehicle 104a. At 910, the availability of the set of spare components at each service center, of the first and second service centers 102a and 102b, is determined. The application server 110 determines the availability of the set of spare components at each of the plurality of service centers 102 (as described in the foregoing description of FIG. 2B). At 912, the cost of servicing the first vehicle 104a at each service center, of the first and second service centers 102a and 102b, is determined, based on the determined plurality of operations. The application server 110 determines the cost of servicing the first vehicle 104a at each of the plurality of service centers 102. The application server 110 determines the cost of servicing the first vehicle 104a by communicating the service quotation request to each of the first and second service center servers 114a and 114b (as described in the foregoing description of FIG. 2B).

Referring to FIG. 9B, at 914, the first vehicle 104a is allocated to the first service center 102a for servicing, based on the determined cost of servicing and the determined availability of the set of spare components at the first service center 102a. The application server 110 allocates the first vehicle 104a to the first service center 102a for servicing, based on the cost of servicing (i.e., the first and second service costs) and the availability of the set of spare components at the first service center 102a and the second service center 102b. At 916, the allocation notification is communicated to the first driver device 106a, based on the allocation. The application server 110 communicates, to the first driver device 106a, the allocation notification that indicates that the first vehicle 104a is allocated to the first service center 102a for servicing. Based on the allocation notification, the first vehicle 104a may be taken to the first service center 102a for servicing.

Figure 10:
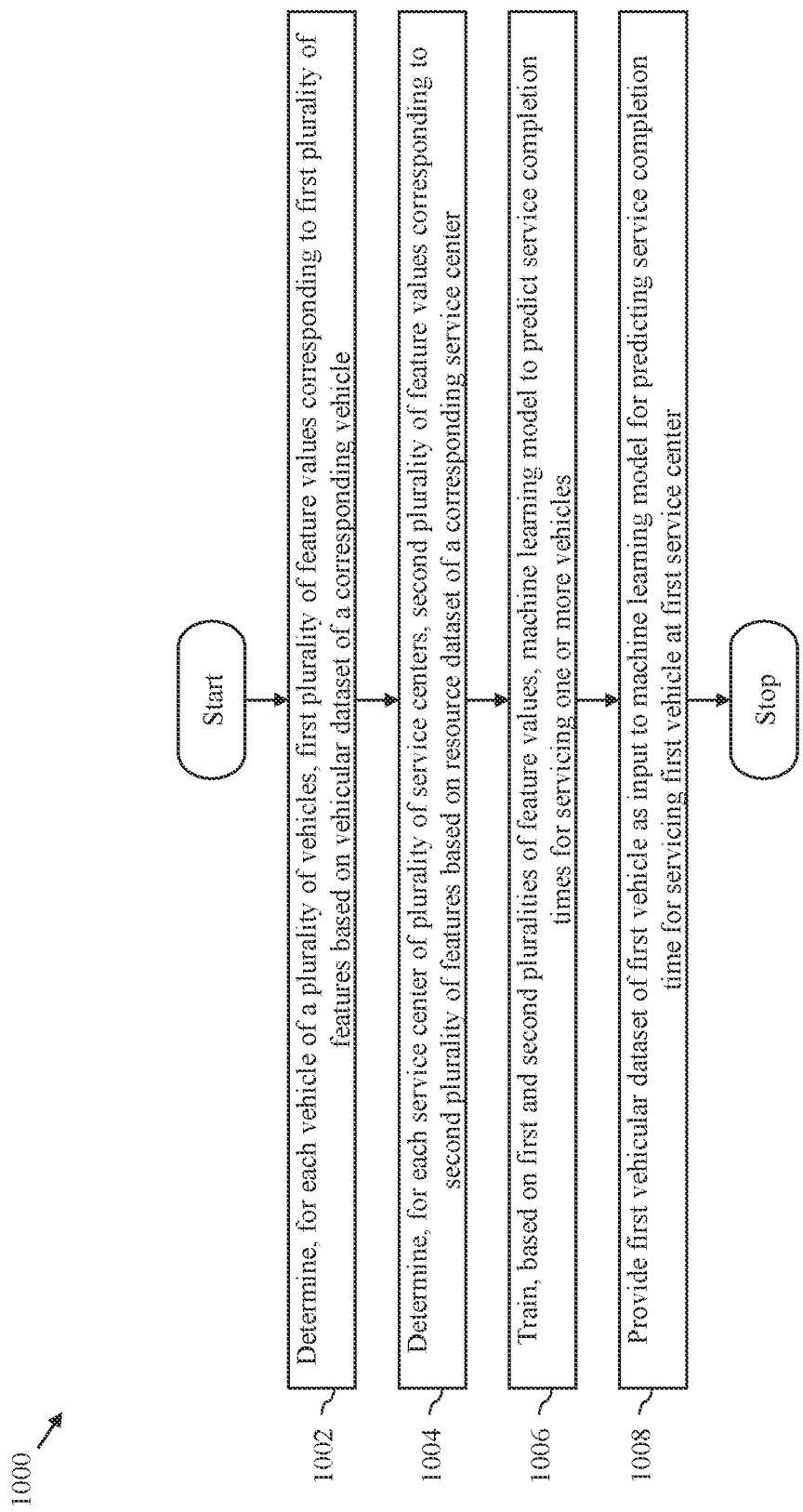
FIG. 10 represents a high-level flowchart for facilitating vehicle servicing, in accordance with an exemplary embodiment of the present disclosure.

FIG. 10 represents a high-level flowchart 1000 for facilitating vehicle servicing, in accordance with an exemplary embodiment of the present disclosure. Referring to FIG. 10, at 1002, for each vehicle of the plurality of vehicles 104, the first plurality of feature values 216a corresponding to the first plurality of features 214a is determined, based on a vehicular dataset of a corresponding vehicle. The application server 110 determines, for each vehicle of the plurality of vehicles 104, the first plurality of feature values 216a corresponding to the first plurality of features 214a, based on a vehicular dataset of a corresponding vehicle. In other words, the application server 110 determines, for each of the first through fifth vehicles 104a-104e, the first plurality of feature values 216a based on the first through fifth vehicular datasets 120, respectively. At 1004, for each service center of the plurality of service centers 102, the second plurality of feature values 216b corresponding to the second plurality of features 216a is determined, based on a resource dataset of a corresponding service center. The application server 110 determines, for each service center of the plurality of service centers 102, the second plurality of feature values 216b corresponding to the second plurality of features 214b, based on a resource dataset of a corresponding service center. In other words, the application server 110 determines, for each of the first and second service centers 102a and 102b, the second plurality of feature values 216b based on the first and second resource datasets 122, respectively. The first and second resource datasets 122 include the service histories of the first and second service centers 102a and 102b, respectively. The second plurality of features 214b include at least a maximum time duration, a minimum time duration, and a median time duration for vehicle servicing at a service center. At 1006, a machine learning model is trained to predict service completion times for servicing one or more vehicles, based on the first and second pluralities of feature values 216a and 216b. The application server 110 trains, based on the first and second pluralities of feature values 216a and 216b, a machine learning model (e.g., the prediction model 212) to predict service completion times for servicing one or more vehicles. At 1008, the first vehicular dataset of the first vehicle 104a is provided as input to the machine learning model (i.e., the trained prediction model 212) for predicting the service completion time for servicing the first vehicle 104a at the first service center 102a. The application server 110 provides the first vehicular dataset of the first vehicle 104a as input to the machine learning model for predicting the service completion time for servicing the first vehicle 104a at the first service center 102a. The machine learning model (i.e., the prediction model 212) predicts the service completion time for servicing the first vehicle 104a at the first service center 102a, based on the inputted first vehicular dataset. The first vehicle 104a is serviced at the first service center 102a in compliance with the predicted service completion time.

Various embodiments of the disclosure provide the application server 110 for facilitating vehicle servicing. The application server 110 may be configured to determine for each vehicle, of the plurality of vehicles 104, the first plurality of feature values 216a corresponding to the first plurality of features 214a based on the vehicular dataset of a corresponding vehicle. The plurality of vehicles 104 have been serviced at the plurality of service centers 102 in the past. The application server 110 may be further configured to determine for each service center, of the plurality of service centers 102, the second plurality of feature values 216b corresponding to the second plurality of features 214b, based on the resource dataset of a corresponding service center. The second plurality of features 214b include at least the maximum time duration, the minimum time duration, and the median time duration for vehicle servicing at a service center. The resource dataset (i.e., the first and second resource datasets) of the corresponding service center (i.e., the first and second service centers 102a and 102b) includes the service history of the corresponding service center. The application server 110 may be further configured to train, based on the first and second pluralities of feature values 216a and 216b, the prediction model 212 (i.e., machine learning model) to predict service completion times for servicing one or more vehicles. The application server 110 may be further configured to provide the first vehicular dataset of the first vehicle 104a to the prediction model 212 as input. The prediction model 212 predicts the service completion time for servicing the first vehicle 104a at the first service center 102a, based on the inputted first vehicular dataset. The first vehicle 104a is serviced at the first service center 102a in compliance with the predicted service completion time Various embodiments of the disclosure provide a non-transitory computer-readable medium having stored thereon, computer executable instructions, which when executed by a computer, cause the computer to execute operations for facilitating vehicle servicing. The operations include determining, by the application server 110, for each vehicle of the plurality of vehicles 104, the first plurality of feature values 216a corresponding to the first plurality of features 214a based on the vehicular dataset of a corresponding vehicle. The operations further include determining, by the application server 110, for each service center of the plurality of service centers 102, the second plurality of feature values 216b corresponding to the second plurality of features 214b, based on the resource dataset of a corresponding service center. The second plurality of features 214b include at least the maximum time duration, the minimum time duration, and the median time duration for vehicle servicing at a service center. The resource dataset (i.e., the first and second resource datasets) of the corresponding service center (i.e., the first and second service centers 102a and 102b) includes the service history of the corresponding service center. The operations further include training, by the application server 110, based on the first and second pluralities of feature values 216a and 216b, the prediction model 212 (i.e., machine learning model) to predict service completion times for servicing one or more vehicles. The operations further include providing, by the application server 110, the first vehicular dataset of the first vehicle 104a to the prediction model 212 as input. The prediction model 212 predicts the service completion time for servicing the first vehicle 104a at the first service center 102a, based on the inputted first vehicular dataset. The first vehicle 104a is serviced at the first service center 102a in compliance with the predicted service completion time.

The disclosed methods encompass numerous advantages. The disclosed methods describe the training of the prediction model 212 based on the first and second pluralities of feature values 216a and 216b for each vehicle and service center, respectively, enabling accurate prediction of service completion times for servicing of vehicles, based on historical data. In other words, all past data (e.g., count of accidents, ratings of service centers, or the like) are taken into account by the prediction model 212, allowing for highly accurate predictions of service completion times. The application server 110 accounts for changing ground conditions at service centers, determining appropriate sequences (e.g., the sequence for performing the plurality of operations) for servicing the vehicles while staying compliant with the predicted service completion times. This results in optimization of operations at the service centers (e.g., the plurality of service centers 102a) and allows the service centers to operate in a highly efficient manner, enabling the service centers to achieve higher revenues and profits. Further, this optimization of operations at the service centers results in lower service completion times for vehicles, increasing a satisfaction for drivers providing vehicles to the service centers for servicing. Each service center of the plurality of service centers 102 may be incentivized or penalized depending on whether it adheres to predicted service completion times, prompting the plurality of service centers 102 to operate quickly and efficiently.

The disclosure further describes determining, based on the first vehicular dataset (i.e., based on asset health index and probability of failure of various vehicular systems), the plurality of operations to be performed on the first vehicle 104*a*. This ensures that unnecessary operations are not performed on the first vehicle 104*a* during the servicing of the first vehicle 104*a*, thereby, reducing a service time and, consequently, the service completion time for the first vehicle 104*a*. The application server 110 determines the availability of the set of spare components at each of the plurality of service centers 102, ensuring that that the driver of the first vehicle 104*a* does not take the first vehicle 104*a* to service centers that do not have requisite spare components. The application server 110 determines the cost of servicing at each of the plurality of service centers 102, allocating the first vehicle 104*a* to a service center (e.g., the first service center 102*a*) that has a lowest cost of servicing. This comparison of service costs at various service centers enables drivers (e.g., the driver of the first vehicle 104*a*) enables to get their vehicles serviced at lowest possible costs. The determination of the sequence for performing the plurality of operations prevents clogging or overloading of the service bays in the plurality of service centers 102. Further, the prediction model 212 may re-trained based on the feedback, from the application server 110, to achieve increasing levels of accuracy.

Techniques consistent with the disclosure provide, among other features, systems and methods for facilitating servicing of vehicles at the plurality of service centers 102. While various exemplary embodiments of the disclosed systems and methods have been described above, it should be understood that they have been presented for purposes of example only, and not limitations. It is not exhaustive and does not limit the disclosure to the precise form disclosed. Modifications and variations are possible in light of the above teachings or may be acquired from practicing of the disclosure, without departing from the breadth or scope.

While various embodiments of the disclosure have been illustrated and described, it will be clear that the disclosure is not limited to these embodiments only. Numerous modifications, changes, variations, substitutions, and equivalents will be apparent to those skilled in the art, without departing from the spirit and scope of the disclosure, as described in the claims.

What is claimed is:

1. A method for facilitating vehicle servicing, the method comprising:
    determining, by a server, for each vehicle of a plurality of vehicles, a first plurality of feature values corresponding to a first plurality of features based on a vehicular dataset of a corresponding vehicle of the plurality of vehicles, wherein the plurality of vehicles have been serviced at a plurality of service centers in past,
        wherein the first plurality of features includes at least two or more of a distance travelled by the corresponding vehicle between a set of consecutive scheduled services, a count of unscheduled repairs of the corresponding vehicle between the set of consecutive scheduled services, or a total distance travelled by the corresponding vehicle since a previous unscheduled service;
    determining, by the server, for each service center of the plurality of service centers, a second plurality of feature values corresponding to a second plurality of features based on a resource dataset of a corresponding service center of the plurality of service centers, wherein the second plurality of features includes at least a maximum time duration, a minimum time duration, and a median time duration for the vehicle servicing at the corresponding service center of the plurality of service centers, and wherein the resource dataset of the corresponding service center includes a service history of the corresponding service center,
        wherein the second plurality of feature values includes an assessment of a health status of each of the plurality of vehicles by a corresponding operator of the plurality of service centers, before and after a service session of the corresponding vehicle at the corresponding service center of the plurality of service centers;
    training, by the server, based on the first plurality of feature values and the second plurality of feature values, a machine learning model to predict service completion times for servicing one or more vehicles of the plurality of vehicles;
    providing, by the server, a first vehicular dataset of a first vehicle of the plurality of vehicles as an input to the machine learning model; and
    predicting, by the trained machine learning model, a service completion time of the service completion times for servicing the first vehicle at a first service center of the plurality of service centers, based on the inputted first vehicular dataset, wherein the first vehicle of the plurality of vehicles is serviced at the first service center in compliance with the predicted service completion time of the first vehicle.

2. The method of claim 1, further comprising providing, by the server, a first resource dataset associated with the first service center to the trained machine learning model as input, wherein the prediction of the service completion time is further based on the inputted first resource dataset.

3. The method of claim 1, wherein the first plurality of features includes at least two or more of a cumulative distance travelled by the corresponding vehicle, an age of the corresponding vehicle, a make and model of the corresponding vehicle, a fuel type of the corresponding vehicle, a geographical location of the corresponding vehicle, or a deviation of the corresponding vehicle from a service schedule.

4. The method of claim 1, wherein the first plurality of features includes at least two or more of a historical usage pattern of the corresponding vehicle, a count of days since a previous scheduled service of the corresponding vehicle, a count of days since the previous unscheduled service of the corresponding vehicle, a set of repair operations performed on the corresponding vehicle, or a count of accidents associated with the corresponding vehicle.

5. The method of claim 1, wherein the first plurality of features includes at least two or more of a current cost per unit distance of operating the corresponding vehicle, a forecasted cost per unit distance of operating the corresponding vehicle, a current asset health index of the corresponding vehicle, a forecasted asset health index of the corresponding vehicle, a cumulative cost of repairing a set of historical faults in the corresponding vehicle, or a cumulative cost associated with a set of historical scheduled services of the corresponding vehicle.

6. The method of claim 1, wherein the first plurality of features includes at least two or more of a service completion time associated with each historical scheduled service of the corresponding vehicle, a repair time associated with each historical repair session of the corresponding vehicle, a cost of the each historical scheduled service of the corresponding vehicle, a cost of each historical unscheduled service of the corresponding vehicle, or a cost of the each historical repair session of the corresponding vehicle.

7. The method of claim 1, wherein the first plurality of features includes at least two or more of a count of accidents associated with the corresponding vehicle after a previous scheduled service, a count of accidents associated with the corresponding vehicle after a previous unscheduled service, or a mean time between failures associated with each of a set of vehicular components in the corresponding vehicle.

8. The method of claim 1, wherein the second plurality of features further includes a work schedule and a holiday schedule of each operator in the corresponding service center of the plurality of service centers and a level of workmanship of each operator in the corresponding service center of the plurality of service centers.

9. The method of claim 1, further comprising:
determining, by the server, a cost of servicing the first vehicle of the plurality of vehicles at each of one or more service centers of the plurality of service centers, wherein the one or more service centers include the first service center; and
allocating, by the server, the first vehicle to the first service center for the service, based on the determined cost of servicing the first vehicle at each of the one or more service centers, wherein the first vehicle arrives at the first service center based on the allocation of the first vehicle to the first service center.

10. The method of claim 9, further comprising determining, by the server, an availability of a set of spare components, for servicing the first vehicle, at each of the one or more service centers, wherein the allocation of the first vehicle to the first service center is further based on the determined availability of the set of spare components at each of the one or more service centers.

11. The method of claim 1, further comprising receiving, by the server, a notification indicating an arrival of the first vehicle at the first service center, wherein the first vehicular dataset is inputted to the trained machine learning model based on the reception of the notification.

12. The method of claim 1, further comprising:
receiving, by the server, a set of diagnostic reports corresponding to servicing of the plurality of vehicles at the plurality of service centers;
analyzing, by the server, the set of diagnostic reports using a set of natural language processing techniques; and
determining, by the server, a portion of the service history of each service center of the plurality of service centers based on the analysis of the set of diagnosis reports.

13. The method of claim 1, further comprising:
determining, by the server, a plurality of operations to be performed on the first vehicle for servicing the first vehicle at the first service center;
identifying, by the server, a set of prevailing ground conditions at the first service center based on arrival of the first vehicle at the first service center; and
determining, by the server, based on the identified set of prevailing ground conditions, a sequence in which operations of the plurality of operations are to be performed on the first vehicle at the first service center for complying with the predicted service completion time.

14. A system to facilitate vehicle servicing, the system comprising:
a server configured to:
determine, for each vehicle of a plurality of vehicles, a first plurality of feature values corresponding to a first plurality of features based on a vehicular dataset of a corresponding vehicle of the plurality of vehicles, wherein the plurality of vehicles have been serviced at a plurality of service centers in past,
wherein the first plurality of features includes at least two or more of a distance travelled by the corresponding vehicle between a set of consecutive scheduled services, a count of unscheduled repairs of the corresponding vehicle between the set of consecutive scheduled services, or a total distance travelled by the corresponding vehicle since a previous unscheduled service;
determine, for each service center of the plurality of service centers, a second plurality of feature values corresponding to a second plurality of features based on a resource dataset of a corresponding service center of the plurality of service centers, wherein the second plurality of features includes at least a maximum time duration, a minimum time duration, and a median time duration for the vehicle servicing at the corresponding service center of the plurality of service centers, and wherein the resource dataset of the corresponding service center includes a service history of the corresponding service center,
wherein the second plurality of feature values includes an assessment of a health status of each of the plurality of vehicles by a corresponding operator of the plurality of service centers, before and after a service session of the corresponding vehicle at the corresponding service center of the plurality of service centers;
train, based on the first plurality of feature values and the second plurality of feature values, a machine learning model to predict service completion times to service one or more vehicles of the plurality of vehicles;
provide a first vehicular dataset of a first vehicle of the plurality of vehicles as an input to the machine learning model; and
predict, by the trained machine learning model, a service completion time of the service completion times to service the first vehicle at a first service center of the plurality of service centers, based on the inputted first vehicular dataset, wherein the first vehicle is serviced at the first service center in compliance with the predicted service completion time.

15. The system of claim 14, wherein the server is further configured to provide a first resource dataset associated with the first service center to the trained machine learning model as input, and wherein the prediction of the service completion time is further based on the inputted first service resource dataset.

16. The system of claim 14, wherein the first plurality of features includes at least two or more of a cumulative distance travelled by the corresponding vehicle, an age of the corresponding vehicle, a make and model of the corresponding vehicle, a fuel type of the corresponding vehicle, a geographical location of the corresponding vehicle, or a deviation of the corresponding vehicle from a service schedule.

17. The system of claim 14, wherein the first plurality of features includes at least two or more of a historical usage pattern of the corresponding vehicle, a count of days since a previous scheduled service of the corresponding vehicle, a count of days since the previous unscheduled service of the corresponding vehicle, a set of repair operations performed on the corresponding vehicle, or a count of accidents associated with the corresponding vehicle.

18. A method for facilitating vehicle servicing, the method comprising:
- determining, by a server, for each vehicle of a plurality of vehicles, a first plurality of feature values corresponding to a first plurality of features based on a vehicular dataset of a corresponding vehicle of the plurality of vehicles, wherein the plurality of vehicles have been serviced at a plurality of service centers in past,
  - wherein the first plurality of features includes at least two or more of a distance travelled by the corresponding vehicle between a set of consecutive scheduled services, a count of unscheduled repairs of the corresponding vehicle between the set of consecutive scheduled services, or a total distance travelled by the corresponding vehicle since a previous unscheduled service;
- determining, by the server, for each service center of the plurality of service centers, a second plurality of feature values corresponding to a second plurality of features based on a resource dataset of a corresponding service center of the plurality of service centers, wherein the second plurality of features includes at least a maximum time duration, a minimum time duration, and a median time duration for the vehicle servicing at the corresponding service center of the plurality of service centers, and wherein the resource dataset of the corresponding service center includes a service history of the corresponding service center,
  - wherein the second plurality of feature values includes an assessment of a health status of each of the plurality of vehicles by a corresponding operator of the plurality of service centers, before and after a service session of the corresponding vehicle at the corresponding service center of the plurality of service centers;
- training, by the server, based on the first plurality of feature values and the second plurality of feature values, a machine learning model to predict service completion times for servicing one or more vehicles of the plurality of vehicles; and
- predicting, by the trained machine learning model, a service completion time of the service completion times for servicing a first vehicle of the plurality of vehicles at a first service center of the plurality of service centers, based on a first vehicular dataset of the first vehicle, wherein the first vehicle is serviced at the first service center in compliance with the predicted service completion time.

* * * * *